(12) United States Patent
Hunnicutt et al.

(10) Patent No.: US 6,764,286 B2
(45) Date of Patent: Jul. 20, 2004

(54) PISTON PUMP WITH PUMP INLET CHECK VALVE

(75) Inventors: Harry A. Hunnicutt, Ann Arbor, MI (US); Richard J. Barron, Ann Arbor, MI (US); Peter Every, Westland, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/054,311

(22) Filed: Oct. 29, 2001

(65) Prior Publication Data

US 2003/0086801 A1 May 8, 2003

(51) Int. Cl.[7] .................................................. F04B 37/12
(52) U.S. Cl. ........................ 417/470; 417/471; 417/549; 417/562; 417/570; 137/859; 91/422; 60/329
(58) Field of Search ................................. 417/470, 471, 417/547, DIG. 1, 549, 550, 552, 553, 554, 555.1, 562, 570; 137/859; 91/422; 92/1; 60/329; 267/170, 166, 286, 155, 167

(56) References Cited

U.S. PATENT DOCUMENTS

| | | | | |
|---|---|---|---|---|
| 3,951,046 A | * | 4/1976 | Lochmann et al. | ............ 92/113 |
| 4,090,914 A | * | 5/1978 | Hauk et al. | ................. 156/523 |
| 4,126,993 A | * | 11/1978 | Grattapaglia et al. | ......... 60/329 |
| 4,272,228 A | * | 6/1981 | Kutik et al. | ................. 417/460 |
| 4,763,563 A | * | 8/1988 | Ikeda et al. | ..................... 92/71 |
| 4,804,290 A | * | 2/1989 | Balsells | ...................... 403/326 |
| 5,163,819 A | * | 11/1992 | Pettitt | ........................... 417/269 |
| 5,213,482 A | | 5/1993 | Reinartz et al. | ............. 417/273 |
| 5,232,207 A | * | 8/1993 | Champ et al. | .................. 267/70 |
| 5,509,444 A | * | 4/1996 | Robinson et al. | ........... 137/508 |
| 5,560,824 A | * | 10/1996 | Sann et al. | ................... 210/234 |
| 5,567,135 A | * | 10/1996 | Mueller et al. | .............. 417/549 |
| 5,588,817 A | | 12/1996 | Zirps et al. | .................. 417/459 |
| 5,639,071 A | * | 6/1997 | Kitchen | ....................... 267/100 |
| 5,688,113 A | * | 11/1997 | Bareiss et al. | ............... 417/549 |
| 5,829,952 A | | 11/1998 | Shadden | ....................... 417/514 |
| 5,839,468 A | * | 11/1998 | Allred | ....................... 137/454.4 |
| 5,897,303 A | * | 4/1999 | Mueller | ....................... 417/549 |
| 5,988,997 A | * | 11/1999 | Siegel | .......................... 417/554 |
| 5,992,944 A | | 11/1999 | Hara | ............................ 303/10 |
| 5,993,179 A | * | 11/1999 | Baur et al. | .................... 417/554 |
| 6,199,962 B1 | * | 3/2001 | Dokas et al. | ............. 303/116.4 |
| 6,238,189 B1 | * | 5/2001 | Guentert | ...................... 417/273 |
| 6,240,962 B1 | * | 6/2001 | Tai et al. | ..................... 137/859 |
| 6,293,764 B1 | * | 9/2001 | Baumann | ..................... 417/273 |
| 6,334,762 B1 | * | 1/2002 | Hauser et al. | .............. 417/569 |
| 6,341,950 B1 | * | 1/2002 | Schuller et al. | ............. 417/554 |
| 6,347,574 B1 | * | 2/2002 | Guentert et al. | ............... 92/72 |
| 6,450,062 B2 | * | 9/2002 | Kojima et al. | ................. 74/513 |
| 6,589,032 B2 | * | 7/2003 | Summers, III et al. | ...... 417/549 |

FOREIGN PATENT DOCUMENTS

JP 8-49646 2/1996

OTHER PUBLICATIONS

Abstract in English of JP 8049646, "Liquid Pressure Pump," obtained from the esp@cenet database, http://12.espacenet-.com/dips/ viewer?PN=JP8049646&CY=ep&LP=en&DB= PAJ, printed Oct. 5, 2001.

* cited by examiner

Primary Examiner—Justine R. Yu
Assistant Examiner—Emmanuel Saya
(74) Attorney, Agent, or Firm—MacMillan, Sobanski & Todd, LLC

(57) ABSTRACT

A piston pump comprises cylinder attached within a cavity of a pump housing. An outlet check valve seat is defined about an outlet of the cylinder. A piston is slidably received in a bore of the cylinder and has a first passageway formed therein. A cylinder head encloses the outlet of the cylinder and defines a second passageway therein. The first passageway has an inlet in fluid communication with the cavity of the pump housing, and an outlet in fluid communication with a pumping chamber defined in the pump housing. A first spring retains the piston to the cylinder. A first check valve member is a ball retained near a valve seat formed in the first passageway of the piston by a disk spring, and allows fluid to flow only from the inlet to the outlet of the piston.

46 Claims, 24 Drawing Sheets

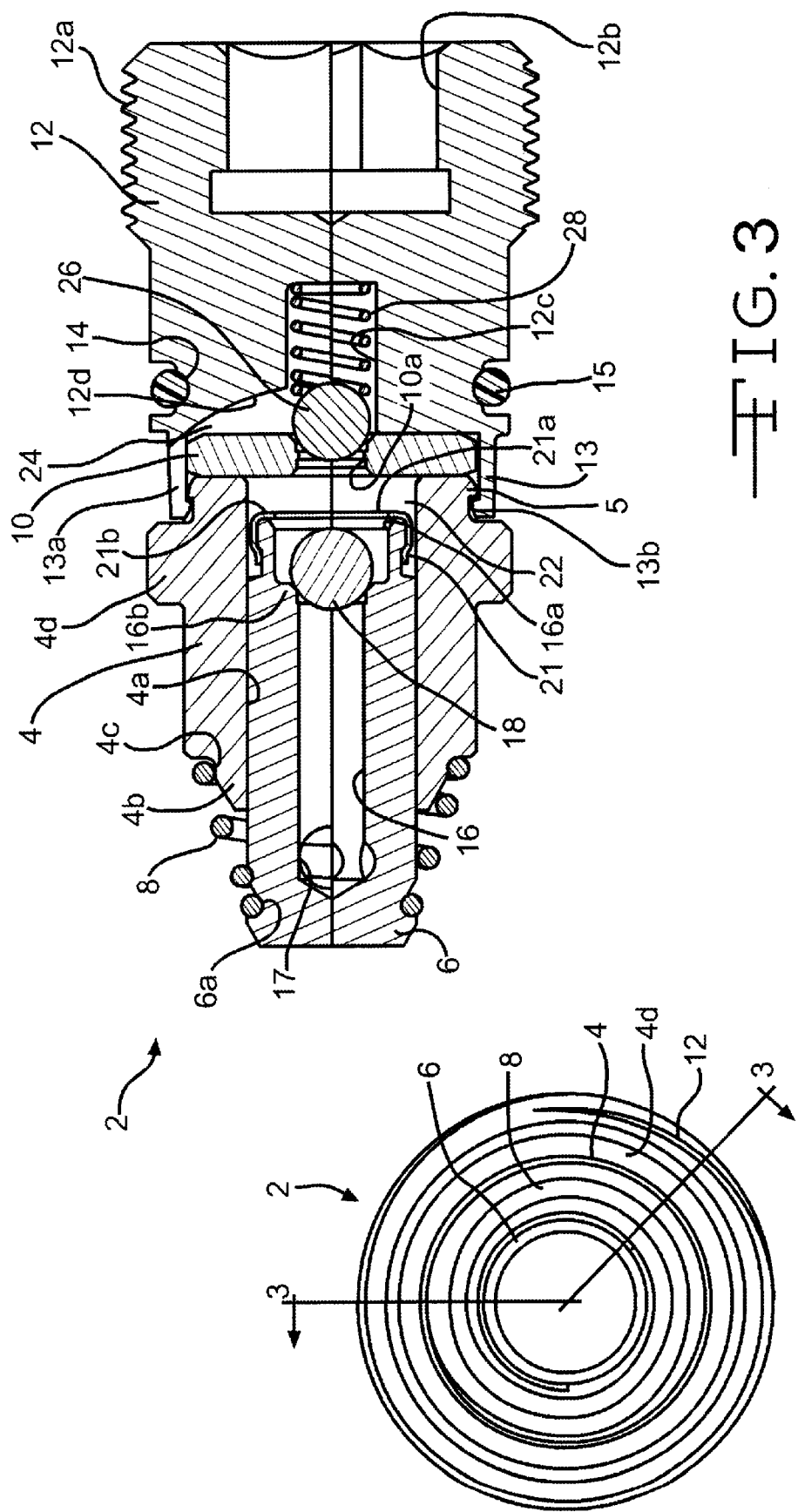

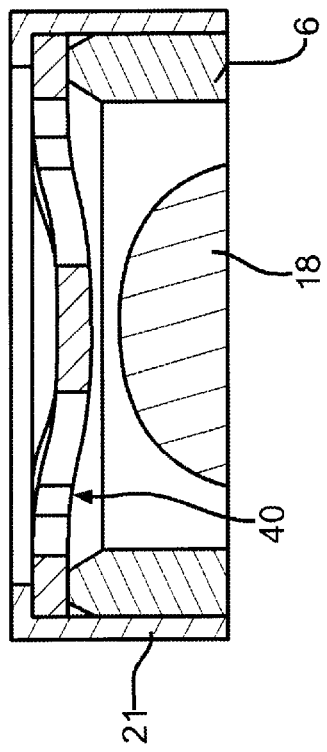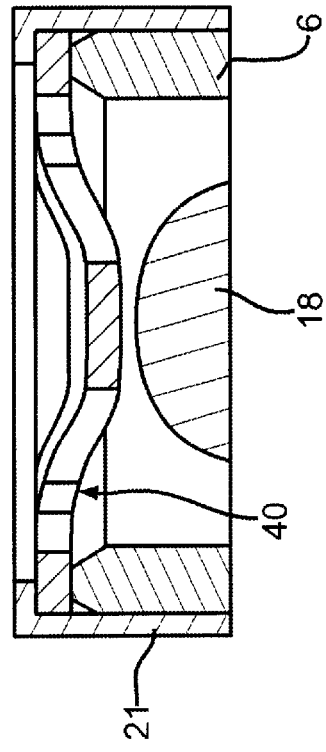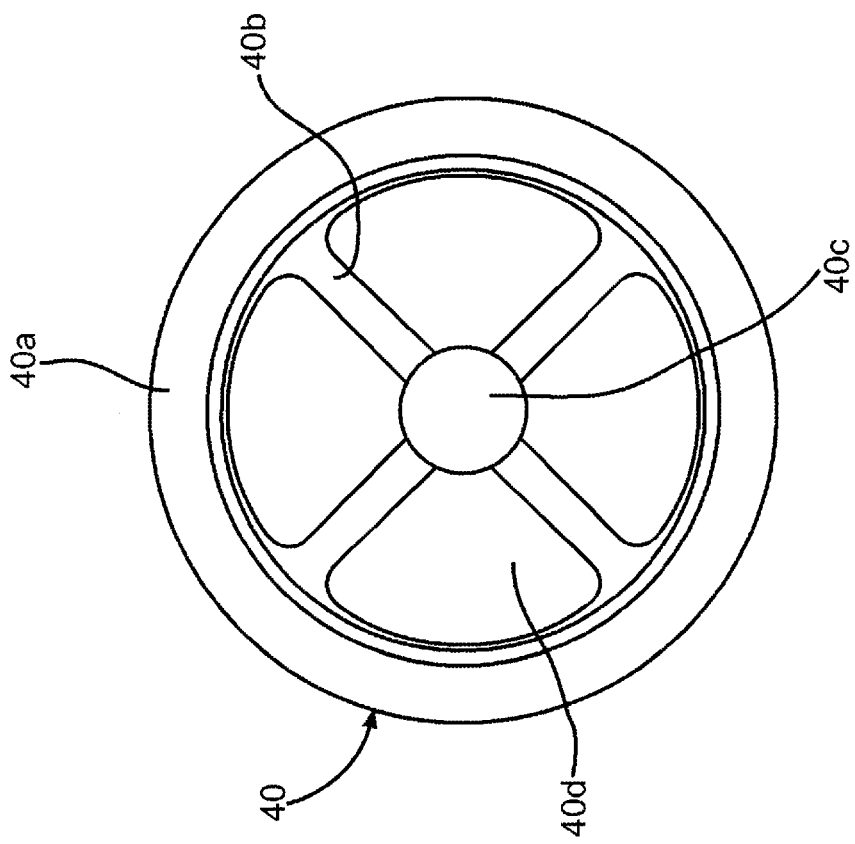

PISTON PUMP WITH PUMP INLET CHECK VALVE

BACKGROUND OF THE INVENTION

The present invention relates generally to piston pumps and, in particular, to a novel piston pump with a novel pump inlet check valve.

Piston pumps are well known. They are positive displacement pumps that typically consist of a pump housing with one or more cylinders contained therein, a respective piston received in each of the cylinders, a respective cylinder heads closing one end of the cylinders, a drive for reciprocating the pistons in the cylinders (e.g., an electric motor and a camshaft), and fluid passageways for routing the working fluid into and out of the pump. The working fluid is introduced into the cylinders, typically through respective inlet check valves, pressurized in the cylinders by the movement of the pistons between the pistons and the respective cylinder head, and urged out of the pump through the fluid passageways, typically through respective outlet check valves. The pistons typically utilize a return spring to urge the piston into contact with the rotating camshaft. The inlet and outlet check valves may also utilize return springs to aid in closing these valves when the pressure drops on the respective upstream side.

During the pump operation, the piston moves away from the cylinder head, reducing pressure in the cylinder, closing the outlet check valve and opening the inlet check valve, and drawing fluid into the cylinder. When the piston is subsequently driven toward the cylinder head, the pressure in the cylinder increases, the inlet check valve closes, and the trapped fluid is pressurized in the cylinder as the piston continues its upward motion. This motion of the piston toward the cylinder head is termed the compression stroke. The outlet check valve opens and allows the pressurized fluid to be delivered to the downstream fluid passageways. The outlet check valve remains open until the pressure in the cylinder decreases, typically when the piston begins away from the cylinder head again. The outlet check valve then closes, the inlet check valve opens, and the cycle is repeated. This motion of the piston away from the cylinder head is termed the suction stroke or intake stroke.

Prior art piston pumps often have been characterized by large unswept volume. Unswept volume is defined as that volume in the cylinder that contains fluid that is compressed when the piston moves from bottom dead center (BDC) to top dead center (TDC), minus the uncompressed volume of fluid that is displaced as the piston moves from BDC to TDC. Unswept volume thus represents the volume of fluid that the pump works to bring to a high pressure, but which remains in the cylinder. The pump has to perform work on, or compress, a set amount of fluid volume with every piston compression stroke, with only a smaller amount of the volume of fluid compressed actually being delivered to the fluid system beyond the outlet check valve. It is therefore desirable to minimize unswept volume.

Furthermore, many prior art pumps were designed with a coil return spring for the piston or the inlet check valve disposed in cylinder between the cylinder head and the piston, thereby limiting how closely the piston could approach the cylinder head, and increasing the unswept volume. This decreases the pump's efficiency.

As noted above, prior art piston pumps utilized an inlet check valve that allowed fluid to flow ahead of the piston on the suction stroke and closed at the bottom of the stroke, usually with the aid of a return spring. It is known in the prior art to limit the movement of the movable element of a check valve so that the movable element cannot get too far from the valve seat so that the movable element reseats more readily when the piston of the associated pump starts on the compression stroke. Prior art pumps with construction optimized at higher temperatures will not operate as efficiently at a low temperature. Pumps thus constructed have structures to keep the movable element of the pump's inlet check valve close to the respective seat to minimize backflow of the hot and relatively low viscosity fluid. However, because the ball is not allowed to move far enough off the seat, the inlet check valve does not allow low temperature, relatively high viscosity fluid to pass freely in the direction of pumping. Conversely, prior art pumps with inlet check valves constructed to work well at low temperature will be less efficient at higher temperature. Such pumps are constructed to allow the movable element to move far from the seat to minimize heat loss while pumping relatively viscous cold fluid. When warm, the movable element is off the seat for too long during the compression stroke of the pump piston and allows excessive fluid to return through the inlet valve instead of being pumped out.

SUMMARY OF THE INVENTION

A piston pump includes a pump housing defining a cavity therein. A cylinder has open first and second ends and is attached to the pump housing within the cavity of the pump housing. A longitudinal bore has an inlet at the first end of the cylinder and an outlet at the second end of the cylinder. An outlet check valve seat is defined about the outlet of the second end of the cylinder. A cylinder head is attached to the cylinder and to the pump housing. The cylinder head encloses the open second end of the cylinder. A second passage way is formed within the cylinder head and has an inlet and an outlet extending from the cylinder head to an aperture in the pump housing. A piston is slidably received in the open end of the cylinder. The piston has a first passageway formed therein. The first passageway has an inlet end in fluid communication with the cavity of the pump housing, and an outlet end in fluid communication with a pumping chamber defined in the pump housing. As the piston moves, the volume of the pumping chamber is varied. A first spring member is attached to an exterior portion of the piston and to the cylinder for retaining the piston in the cylinder. A first check valve member is disposed in the outlet end of the first passageway of the piston to allow fluid to flow only from the inlet end to the outlet end of the first passageway of the piston. In a preferred embodiment, a shoulder defined at the outlet end of the first passageway of the piston defines a piston valve seat, and the first check valve member is embodied as a ball, which is retained near the piston valve seat by a generally planar retaining element. In the preferred embodiment, the retaining element is generally cup-shaped and has a plurality of apertures formed therethrough for the passage of fluid.

In another preferred embodiment, the retaining element includes a disk spring for varying the distance that the ball may move off the piston valve seat.

In another preferred embodiment, the retaining element has a temperature sensitive design in which the distance that the retaining element permits the ball to move off the piston valve seat varies according to the temperature of the fluid passing through the pump.

In another preferred embodiment, the first check valve member includes a movable valve element which is urged toward to an associated piston valve seat by a spring fastened to both the movable valve element and the piston, with the seat being pressed into the outlet end of the first passageway of the piston.

In another preferred embodiment, the first check valve member includes a flat disk selectively sealing against the piston about the outlet of the first passageway. The pump also includes an outlet check valve permitting pressurized fluid to flow from the pumping chamber to the outlet of the piston pump. In various preferred embodiments the outlet check valve can be embodied as a ball check valve or a check valve having a generally flat disk shape.

Various objects and advantages of this invention will become readily apparent to those skilled in the art from the following detailed description of the preferred embodiment, when considered in light of the accompanying drawings.

DESCRIPTION OF THE DRAWINGS

FIG. 2 is a cross-sectional view of the piston pump taken along the line 2—2 of FIG. 1;

FIG. 3 is a cross-sectional view of the piston pump taken along the line 3—3 of FIG. 2;

FIG. 14 is a plan view of an alternate embodiment of a movable check valve element in accordance with the present invention;

FIG. 15 is a cross-sectional side view of a retainer with the movable check valve element of FIG. 14, showing the movable check valve in a first bowed position;

FIG. 15A is a cross-sectional side view of a retainer with the movable check valve element of FIG. 14, showing the movable check valve in a second bowed position;

DESCRIPTION OF THE PREFERRED EMBODIMENT

Figure 1:
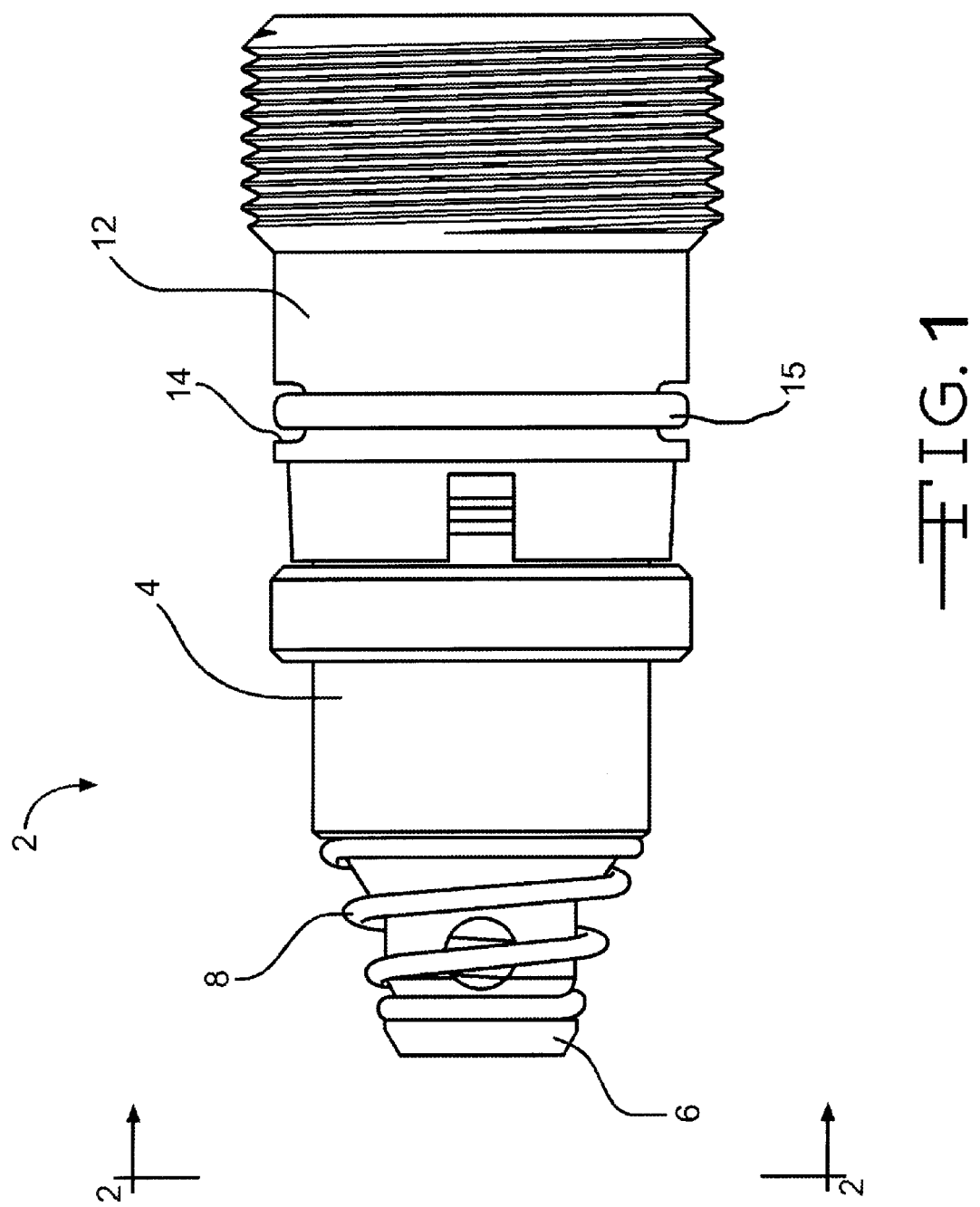
FIG. 1 is a side elevational view of a piston pump in accordance with the present invention.

Referring to FIGS. 1, 2, and 3, a piston pump is indicated generally at 2. The pump 2 has at least one cylinder 4 having first and second ends, and having a longitudinally extending bore 4a formed through the cylinder 4 between the first and second ends. A longitudinal extension 4b of the cylinder 4 in the form of a frustum of a cone is formed at the first end of the cylinder 4. The extension 4b has a circumferentially extending groove 4c formed at the largest diameter portion thereof, the purpose of which will be described below. A preferably circumferential radially outwardly extending rib 4d is formed on the cylinder 4 between the first and second ends thereof. A circumferential radially outwardly extending annular lip 5 is formed at the second end of the cylinder 4.

A first spring member 8 is attached to the cylinder 4. The first spring member 8 is preferably a conical compression spring and is constructed of steel or any other suitable resilient material. The large diameter end of the conical spring 8 is seated in the groove 4c of the cylinder 4 with a snap fit, to retain the spring 8 on the cylinder 4.

A generally cylindrical piston 6 is partially received in the bore 4a of the cylinder 4 with a slip fit. A first end of the piston 6 is disposed outside the cylinder 4, while a second end of the piston 6 is disposed inside the cylinder 4. As best seen in an enlarged view of the piston in FIG. 4, a circumferentially extending groove 6a is formed in the outer surface of the piston 6 at the first end of the piston 6. The small diameter end of the conical spring 8 is seated in the groove 6a with a snap fit, to retain the spring 8 on the piston 6. This allows the piston 6 to be inserted into the cylinder 4 and retained therein by fixing the conical spring 8 to the cylinder 4 and the piston 6 by urging the spring 8 over the first ends of the cylinder 4 and the piston 6. The conical shape of the extension 4b of the cylinder will help expansion of the large end of the spring 8 as the spring 8 is pushed longitudinally across the outer surface of the extension 4b toward the groove 4c. The first end of the piston 6 is similarly tapered to facilitate expansion of the small diameter end of the spring 8 as the spring 8 is pushed longitudinally across the outer surface of the front end of the piston 6 toward the groove 6a. The pre-assembly of selected components of the pump 2 into an easily handled subassembly will facilitate manufacturing of the pump 2.

It will be appreciated that prior to being seated in the groove 4c of the cylinder 4 and the groove 6a of the piston 6, the spring 8 is in a relaxed condition. In such a relaxed condition the large diameter end of the spring 8 has a diameter slightly smaller than a diameter of the groove 4c. Further, the small diameter end of the spring 8 has a diameter slightly smaller than a diameter of the groove 6a. As best shown in FIG. 3, the large diameter end of the spring 8 is moved over the conically-shaped extension 4b of the cylinder 4 until the large diameter end of the spring 8 becomes seated in the groove 4c. As the large diameter end of the spring 8 moves over the extension 4b the large diameter end of the spring 8 expands slightly. The large diameter end of the spring 8 then contracts when seated in the groove 4c, thereby defining a snap fit between the large diameter end of the spring and the cylinder 4. In a similar manner, the small diameter end of the spring 8 is moved over an outer surface of the piston 6 until the small diameter end of the spring 8 becomes seated in the groove 4c. As the small diameter end of the spring 8 moves over the outer surface of the piston 6 the small diameter end of the spring 8 expands slightly. The small diameter end of the spring 8 then contracts when seated in the groove 6a, thereby defining a snap fit between the small diameter end of the spring 8 and the piston 6.

A first fluid passageway 16 is defined inside the piston 6. The first fluid passageway 16 is preferably a longitudinally bored passage in the center of the piston 6. The first fluid passageway 16 includes an opening 16a in the axial face of the second end of the piston 6. A shoulder 16b is formed in the first fluid passageway 16, between a large diameter portion at the second end of the first fluid passageway 16, and a smaller diameter portion extending toward the first end of the first fluid passageway 16. The first fluid passageway 16 includes at least one radially extending bore 17 out through a side of the piston 6 near the first end of the first fluid passageway 16.

Figure 4:
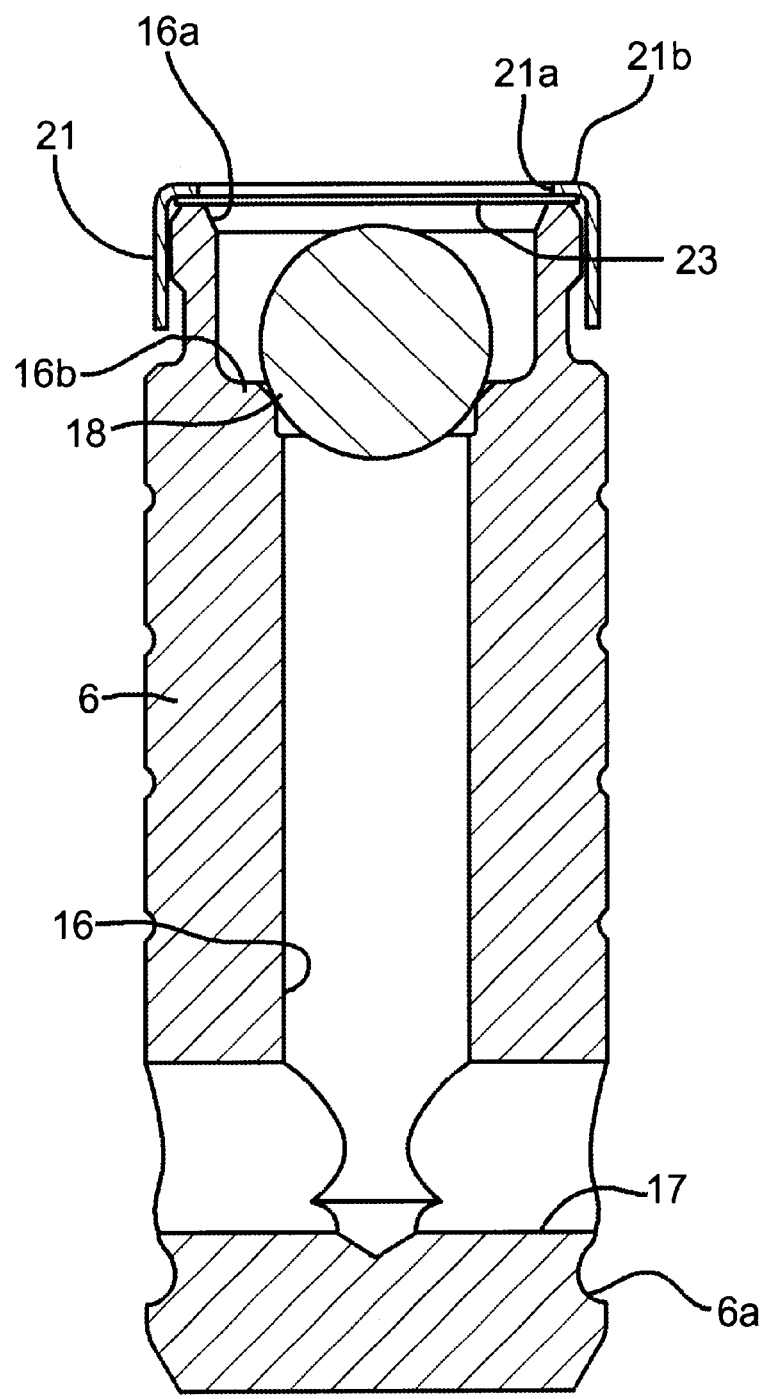
FIG. 4 is an enlarged cross-sectional view of the piston with a movable spring element of FIG. 3.

An inlet check valve of the pump 2 includes a generally spherical first check valve member 18 disposed inside the piston 6. The member 18 abuts a piston valve seat formed on the shoulder 16b. The member 18 is retained in the piston 6 by a cup-shaped retainer 21. The retainer 21 includes a large central aperture 21a extending therethrough on an axial face 21b to allow passage of the working fluid therethrough. The retainer 21 is attached to the piston 6 by any suitable manner, such as crimping, and also attaches a movable spring element 23 to the piston as illustrated in FIG. 4. The spring element 23 is discussed in more detail below. For now, it will be pointed out that the spring element 23 has openings therethrough through which the working fluid can flow. The spring element 23 is preferably spaced slightly away from first check valve member 18 so as to not apply any pre-load thereto, which would hinder movement of low pressure fluid through the inlet check valve of the pump 2. The inlet check valve substantially allows the working fluid to flow only one way through the second fluid passage 16, in a direction from the first end of the second fluid passage toward the opening 16a at the second end of the first fluid passageway 16, that is, in a direction where the fluid will tend to urge the first check valve member 18 to move off the seat defined on the shoulder 16b.

Figure 5:
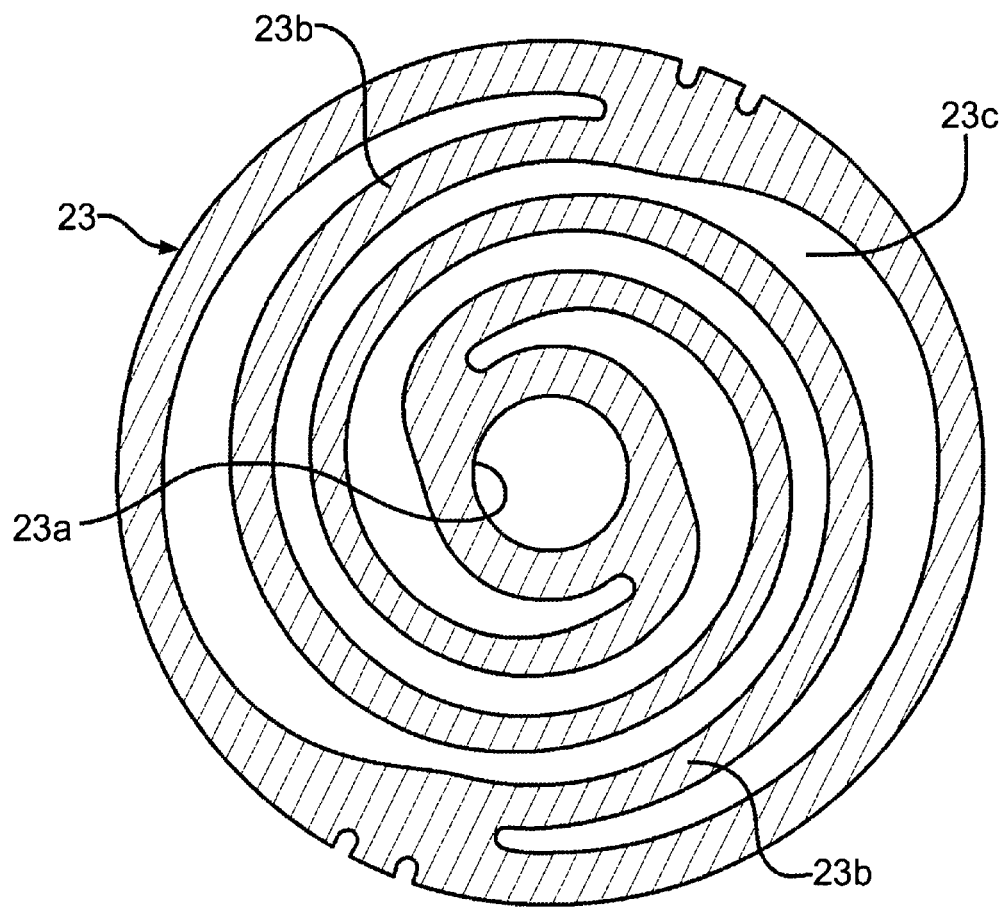
FIG. 5 is a plan view of the moveable spring element of FIG. 4.
Figure 5A:
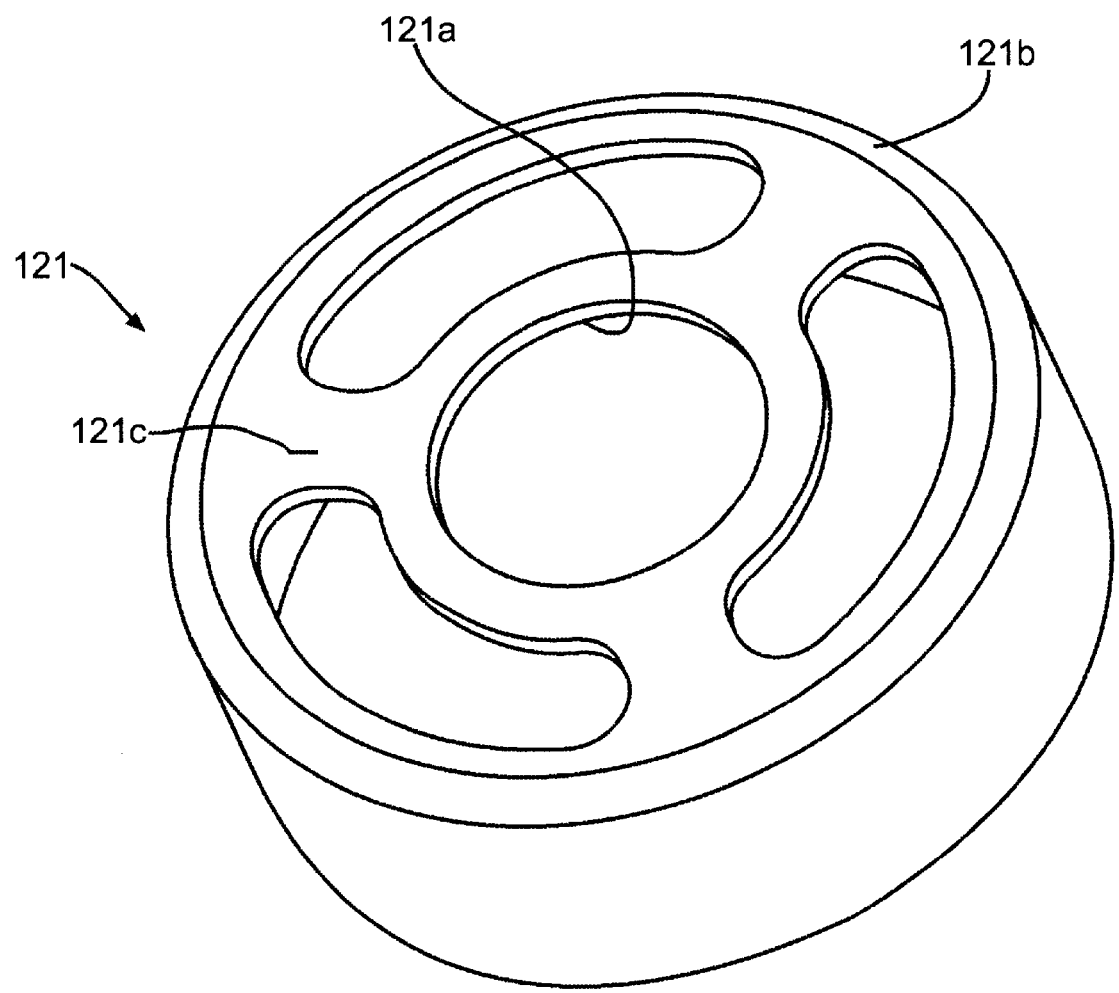
FIG. 5A is a perspective view of an alternate embodiment of the retainer in accordance with the present invention.

FIG. 5A illustrates an alternate embodiment of the retainer, shown generally at 121. The retainer 121 may be used in lieu of the retainer 21 and the spring element 23. The retainer 121 is generally cup-shaped and includes a central aperture 121a for receiving the fist check valve member 18 in an axial face 121b of the retainer 121. The axial face 121b further includes a plurality of radially extending legs 121c defining channels 121c to allow passage of working fluid therethrough. The retainer 121 allows the first check valve member 18 to move axially between the valve seat 16b and the aperture 121a of the retainer 121. Like retainer 21, the retainer 121 is attached to the piston 6 by any suitable manner, such as crimping.

Figure 6:
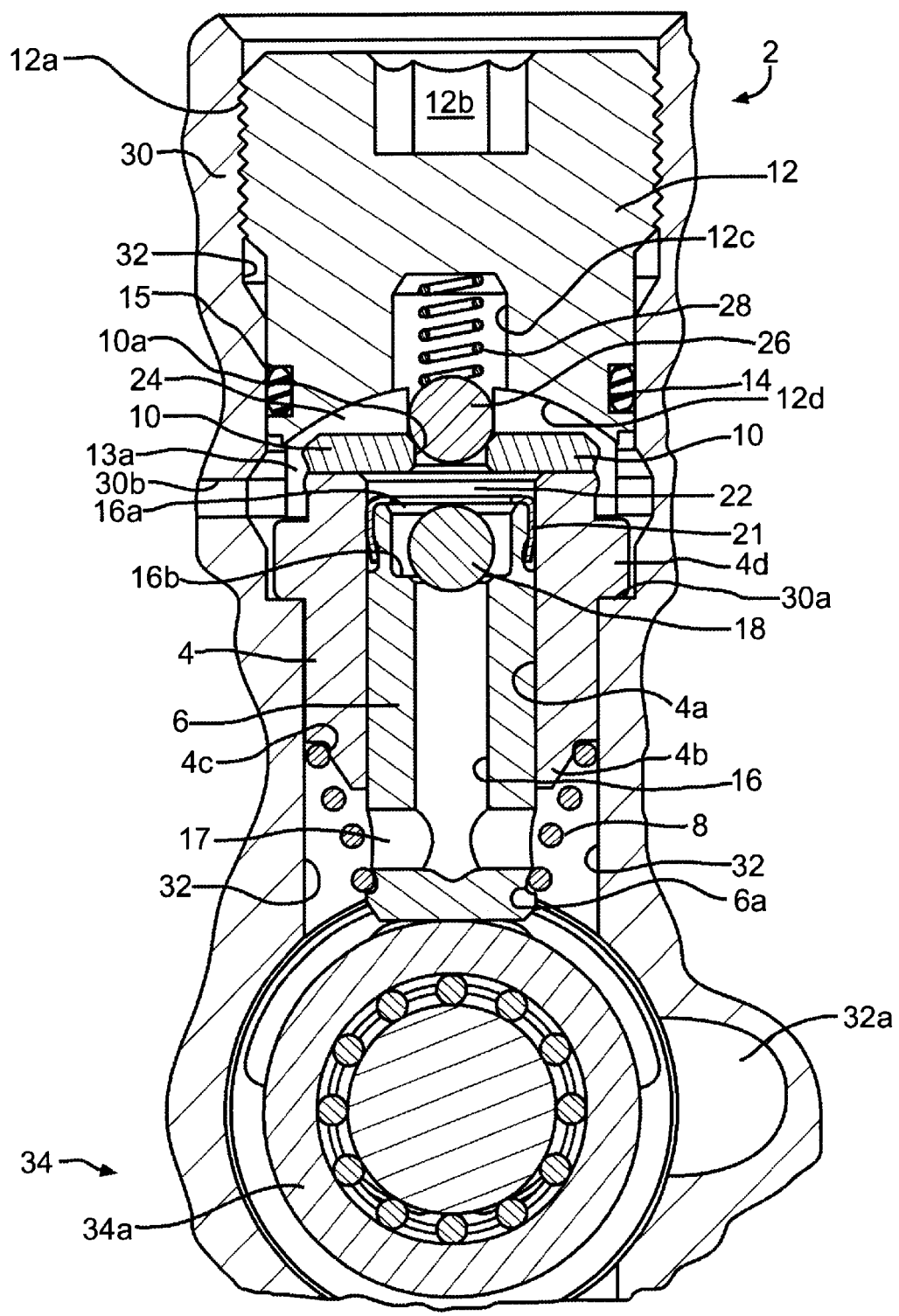
FIG. 6 is a cross-sectional view of the piston pump in accordance with the present invention.

Referring now to FIGS. 3 and 6, an outlet check valve seat 10 abuts the axial face of the second end of the cylinder 4. The outlet check valve seat 10 is preferably disk-shaped and has an aperture 10a formed in the center thereof, which allows the passage of a working fluid (not shown) therethrough.

A generally cylindrical cylinder head 12 is attached to the cylinder 4. A skirt 13 extending axially from a first end of the cylinder head 12, and extends over the annular lip 5 on the cylinder 4. A slot 13a is formed in the skirt 13 for a purpose that will be discussed below. A radially inwardly extending boss 13b formed about the skirt can be pressed over the lip 5 with a snap fit in a preferred embodiment. Alternatively, the skirt 13 may be formed with a large enough diameter to allow the boss 13b to pass freely over the lip 5, with the skirt 13 subsequently being constricted about the cylinder 4, such as by swaging or crimping. The lip 5 on the cylinder 4 cooperates with the boss 13b to retain the head 12 on the second end of the cylinder 4. The cylinder head 12 abuts the outlet check valve seat 10, and retains the outlet check valve seat 10 butting against the axial face of the second end of the cylinder 4. Pre-assembly attachment of the cylinder head 12 and the components disposed therein to the sub assembly consisting of the cylinder 4 and the piston 6 and the parts contained therein will further facilitate manufacture of the pump 2.

The outer surface of the cylinder head 12 defines a circumferential groove 14. An O-ring 15 is seated in the groove 15, for a purpose that will be described below. The outer surface of the cylinder head 12 is threaded over a portion 12a thereof. A drive socket 12b is preferably formed in a second end of the cylinder head 12 to assist in screwing the cylinder head into a pump housing (described below). A cylindrical central recess 12c is formed in the first end of the cylinder head 12 for a purpose that will be described below. A laterally extending recess 12d in the first end of the cylinder head provides fluid communication between the central recess 12c of the cylinder head 12 and the slot 13a in the skirt 13.

A pumping chamber or second fluid passageway 22 is defined between the piston 6 and the outlet check valve seat 10. The volume of the second fluid passageway 22 is dependent upon the position of the piston 6 relative to the outlet check valve seat 10. More specifically, the first check valve member 18, the piston 6, the cylinder 4 the outlet check valve seat 10, and a second check valve member 26 cooperate to define the second fluid passageway 22. The second fluid passageway 22 is disposed between the first fluid passageway 16 and a third fluid passageway 24, and the second fluid passageway 22 defines a volume known as the swept volume.

The third fluid passageway 24 includes the recess 12d in the cylinder head 12, and the slot 13a in the skirt 13. The third fluid passageway 24 extends to a fluid conduit described below. An outlet check valve of the second fluid passageway 22 includes the outlet check valve seat 10 and the generally spherical second check valve member 26 disposed between the cylinder head 12 and the cylinder 4. The second check valve member 26 is partially disposed in the central cylindrical recess 12c. A third spring member 28 is disposed in the central cylindrical recess 12c, and is seated at a first end against the second check valve member 26, and seated at a second end against the cylinder head 12. The third spring member 28 biases the second check valve member 26 toward the outlet check valve seat 10 of the cylinder 4. The third spring member 28 is preferably helical in shape and constructed of steel or similar material. The second check valve member 26 allows the working fluid (not shown) to flow only from the second fluid passageway 22 to the third fluid passageway 24.

Referring now to FIG. 6, the piston pump 2 is shown installed in a pump housing 30 having a cavity 32. The housing 30 defines a shoulder 30a in the cavity 32. The rib 4d of the cylinder abuts the shoulder 30a to position the cylinder 4 in the cavity 32. The working fluid is introduced into the cavity 32 through a suction passage 32a. The radial bore 17 in the piston 6 provides fluid communication between the cavity 32 and the first fluid passageway 16. The cylinder head 12 is also attached to the pump housing 30, with the threaded portion 12a of the cylinder head 12 engaging a corresponding threaded portion of the wall of the cavity 32. The O-ring 15 seals between the cylinder head 12 and the housing 30 to prevent the working fluid from leaking out of the cavity 32 between the cylinder head 12 and the wall of the cavity 32. The third fluid passageway 24 is in fluid communication with a high pressure fluid outlet passageway 30b in the housing 30. The high pressure fluid outlet 30b forms a portion of a discharge path of the piston pump 2, and supplies fluid to, for example, an ABS braking system (not shown.). The piston pump 2 is also shown with a drive for reciprocating the piston 6, shown generally at 34. The drive for reciprocating the piston 34 is preferably an eccentric drive bearing 34a from a pump motor (not shown).

Figure 12:
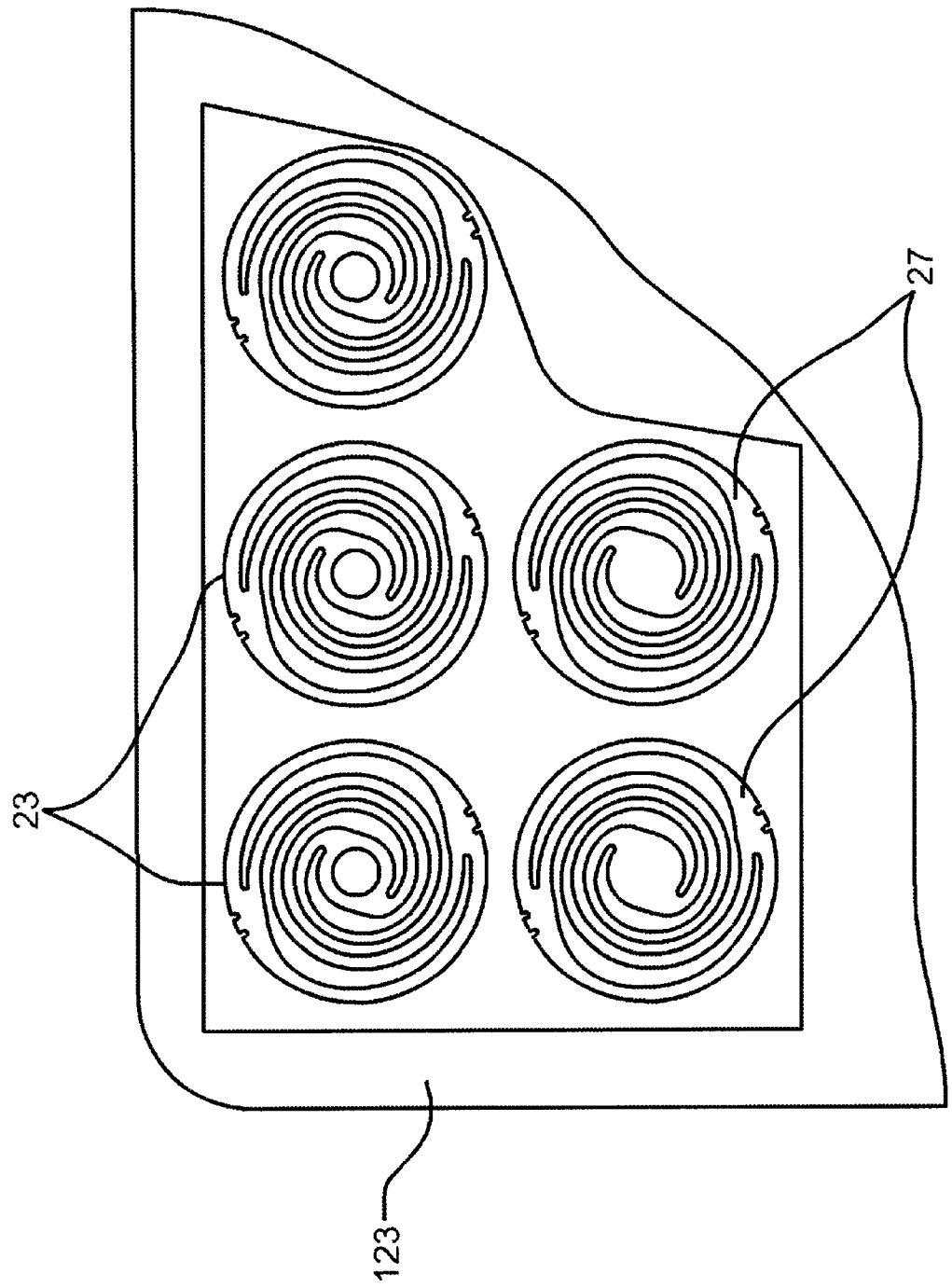
FIG. 12 is a partial plan view of a sheet of the moveable spring elements of FIG. 5.

As described above, the retainer 21 retains the movable spring element 23. As shown in FIG. 5, the movable spring element 23 is a generally annular disk having a central aperture 23a for receiving the first check valve member 18, and a plurality of spirally arranged legs 23b defining channels 23c for the passage of fluid. As the spring is deflected upwardly (as viewed in FIG. 4) by the first check valve member 18, the spring stiffness increases as the valve member 18 pushes on a shorter and shorter length of each leg 23b. As shown in FIG. 12, the spring element 23 may be formed by any suitable method, such as forming a plurality of springs 23 by conventional precision photo etching. Such photo etching may allow a plurality of springs to be formed on a sheet 123 of suitable material, such as steel, thereby minimizing manufacturing cost and increasing the dimensional accuracy of the spring element 23.

Referring again to FIGS. 3 and 6, the piston pump 2, in operation, compresses the working fluid when the drive 34 actuates the piston 6 in the cylinder 4. As the piston 6 moves towards the drive 34 (downward motion as viewed in FIG. 6), the working fluid is introduced through the radial bore 17 and into the first fluid passageway 16 from the cavity 32. The working fluid passes into the second fluid passageway 22 via the first check valve member 18. The working fluid is then pressurized in the second fluid passageway 22, after the first check valve member 18 closes, by the motion of the piston 6 towards the second check valve member 26 (upward motion as viewed in FIG. 6). The working fluid is delivered to the third fluid passageway 24 when the second check valve member 26 opens. The third fluid passageway 24 routes the working fluid to the high pressure fluid outlet passageway 30b. After the piston 6 completes its upward motion, the piston 6 again begins a downward motion, the second check valve member 26 closes, the first check valve member 18 opens, and the cycle is repeated. The downward motion of the piston 6 is aided by a force exerted by the first spring member 8.

Although cylinder 4 is illustrated with a groove 4c for receiving the spring 8, it will be appreciated that satisfactory results may be achieved by a cylinder without a groove 4c, wherein, for example, the spring 8 abuts a shoulder formed at the first end of the cylinder 4.

Figure 7:
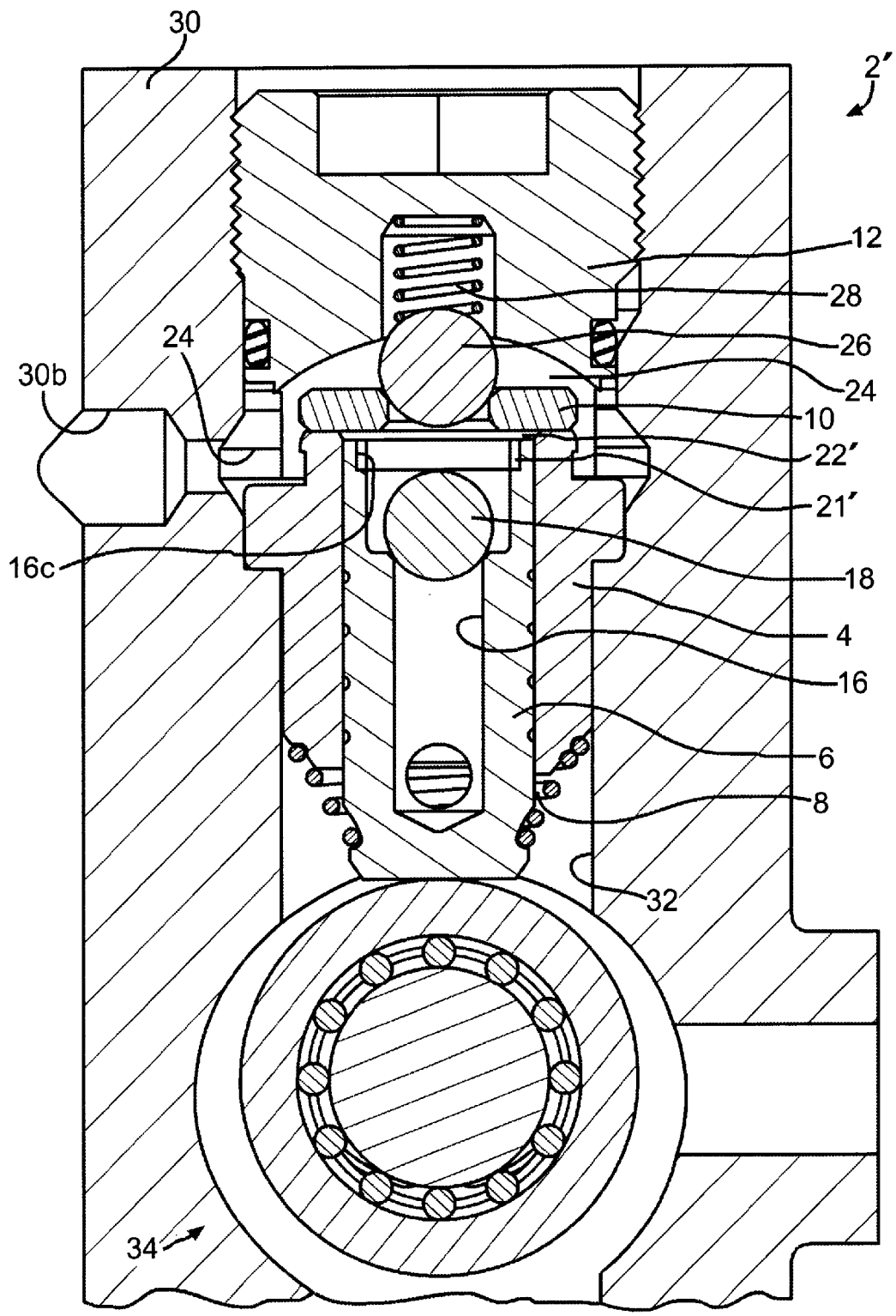
FIG. 7 is a cross-sectional view of an alternate embodiment of a piston pump in accordance with the present invention.

Referring now to FIG. 7, an alternate embodiment of a piston pump is shown generally at 2'. The piston pump 2' contains many of the same elements as piston pump 2 (see FIG. 6), but contains a different retainer 21'. The retainer 21' is a cup-shaped retainer of a split collar type that is attached to the piston 6 within a circumferential groove 16c of the first fluid passageway 16. Similar to the piston pump 2, a second fluid passageway 22' is formed between first check valve member 18 and the second check valve member 26. The remaining structure and operation of the piston pump 2' is identical to structure and operation of the piston pump 2. It will be appreciated that satisfactory results may be achieved by a cylinder wherein the outlet check valve seat 10 and the cylinder 4, as illustrated in FIGS. 3, 6, and 7, are formed as one piece (not shown).

Figure 8:
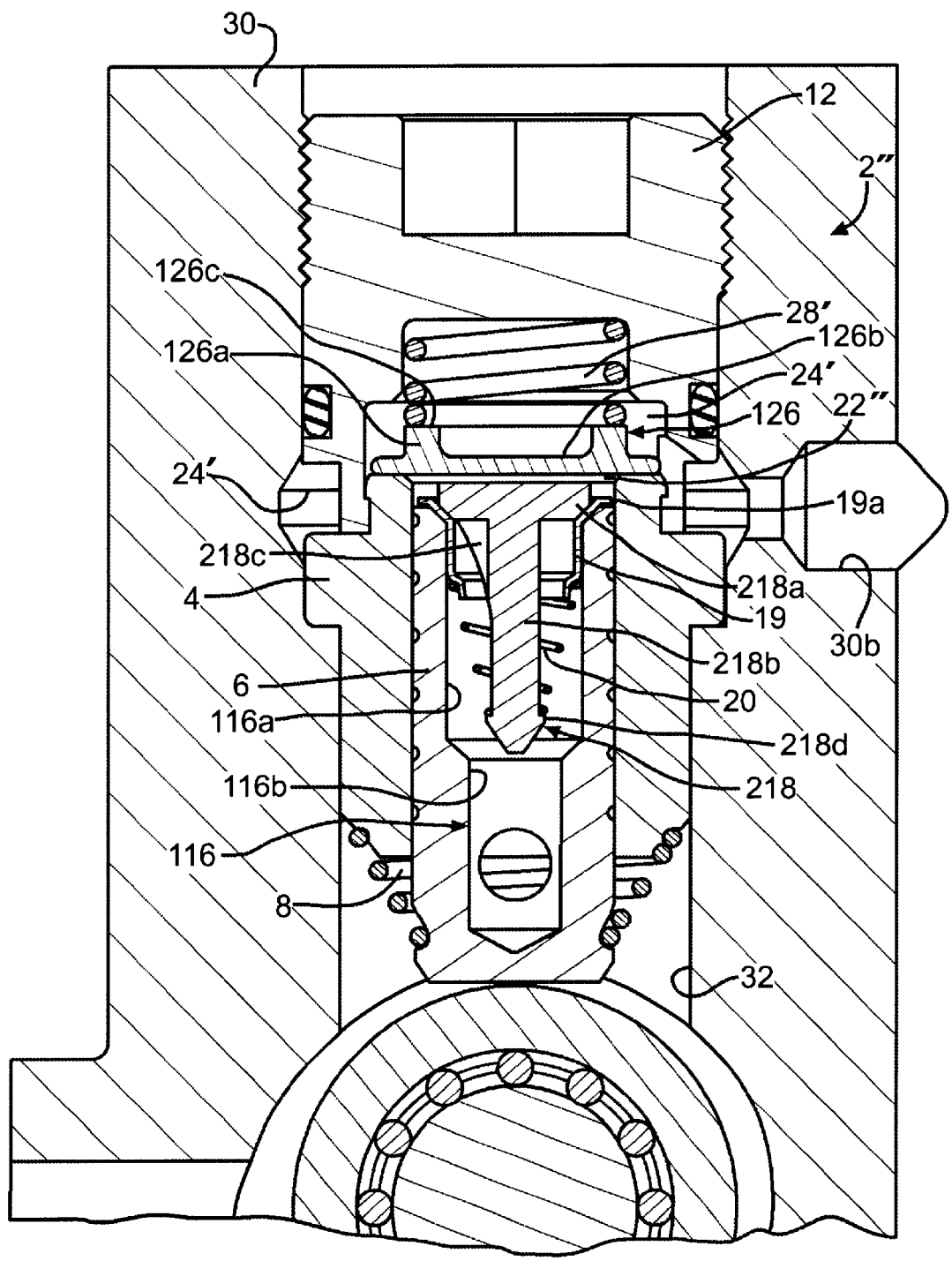
FIG. 8 is a cross-sectional view of an alternate embodiment of a piston pump in accordance with the present invention.
Figure 9:
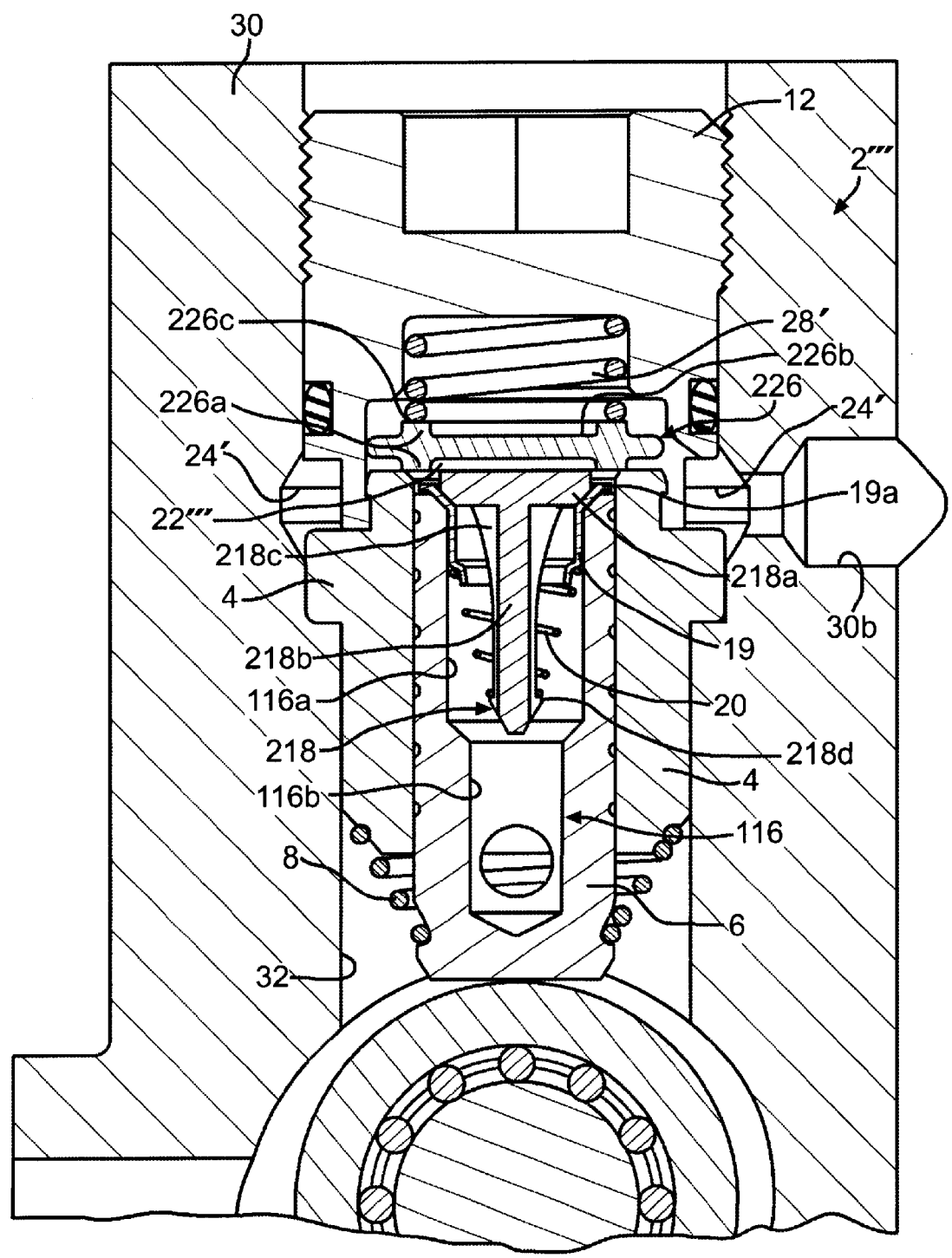
FIG. 9 is a cross-sectional view of an alternate embodiment of a piston pump in accordance with the present invention.

Referring now to FIG. 8, another alternate embodiment of a piston pump is shown generally at 2". The piston pump 2" contains many of the same elements as piston pump 2 and 2', but does contain alternate elements. Importantly, the piston pump 2" includes a first check valve member 218 disposed within a first fluid passage 116 of the piston 6, as best seen in FIG. 9. The first fluid passage 116 includes a large diameter portion 116a for receiving the valve member 218 and a small diameter portion 116b. The first check valve member 218 includes a head 218a in the shape of a flat circular disk, similar to the head 118a. A shaft 218b has a generally cylindrical first end connected to the head 218a and a generally conical second end opposite the head 218a. Three generally triangular gussets or fins 218c are disposed circumferentially on the shaft 218b at about 120 degrees from each other, and extend axially along, and are fixed to, the shaft 218b from the first end to the second end of the shaft 218b. The fins also extend radially along and are fixed to a surface of the head 118a. A lip 218d for attaching a small diameter end of a second spring member 20 is formed in each fin 218c at the second end of the shaft 218b. The second spring member 20 is preferably a conical compression spring constructed of steel or similar material.

A large diameter end of the second spring member 20 is also attached to a generally bell-shaped check valve seat 19. The check valve seat 19 is preferably pressed into the first fluid passageway 116 within the piston 6 during assembly of the piston pump 2". The check valve seat 19 also incorporates a flange 19a to accept a tool (not shown) used for installing the check valve member 218 and the second spring member 20 into the piston 6.

The piston pump 2" also includes a second check valve member 126. The second check valve member 126 is generally disk-shaped with first and second opposed faces.

The first face is generally flat and abuts the second end of the cylinder 4. The first face cooperates with the cylinder 4 to define a separation between a second fluid passageway 22", and a third fluid passageway 24'. The flat surface of the first face of the second check valve member 126 greatly reduces the unswept volume of the second fluid passageway 22".

The second face of the second check valve member 126 includes an annular boss 126a, centered thereon. The annular boss 126a defines a generally cylindrical recess 126b. An outwardly extending surface 126c of the annular boss 126a contacts one end of a third spring member 28'. The spring 28' urges the check valve member 126 against the end of the cylinder 4. The second fluid passageway 22" is formed between first check valve member 218 and the second check valve member 126. As described in reference to FIG. 7, the third fluid passageway 24' is connected to a high pressure fluid outlet 30b, which supplies fluid to, for example, an ABS braking system (not shown). The remaining structure and operation of the piston pump 2" is identical to structure and operation of the piston pump 2'.

Referring now to FIG. 9, another alternate embodiment of a piston pump is shown generally at 2'''. The piston pump 2''' contains many of the same elements as piston pump 2", but contains a different second check valve member 226.

The second check valve member 226 is disk-shaped with identical first and second opposed faces. Each face includes an annular boss 226a, centered thereon. The annular boss 226a defines a generally cylindrical recess 226b. An outwardly extending surface 226c of the annular boss 226a of one face contacts one end of the third spring 28'. The spring 28' urges the check valve member 226 against the end of the cylinder 4. The other outwardly extending surface 226c of the other face abuts the second end of the cylinder 4. The symmetrical design of the check valve member 226 allows the check valve member 226 to be installed with either its first or second faces abutting the second end of the cylinder 4. A second fluid passageway 22''' is formed between the first check valve member 218 and the second check valve member 226. The remaining structure and operation of the piston pump 2''' is identical to structure and operation of the piston pump 2".

Figure 10:
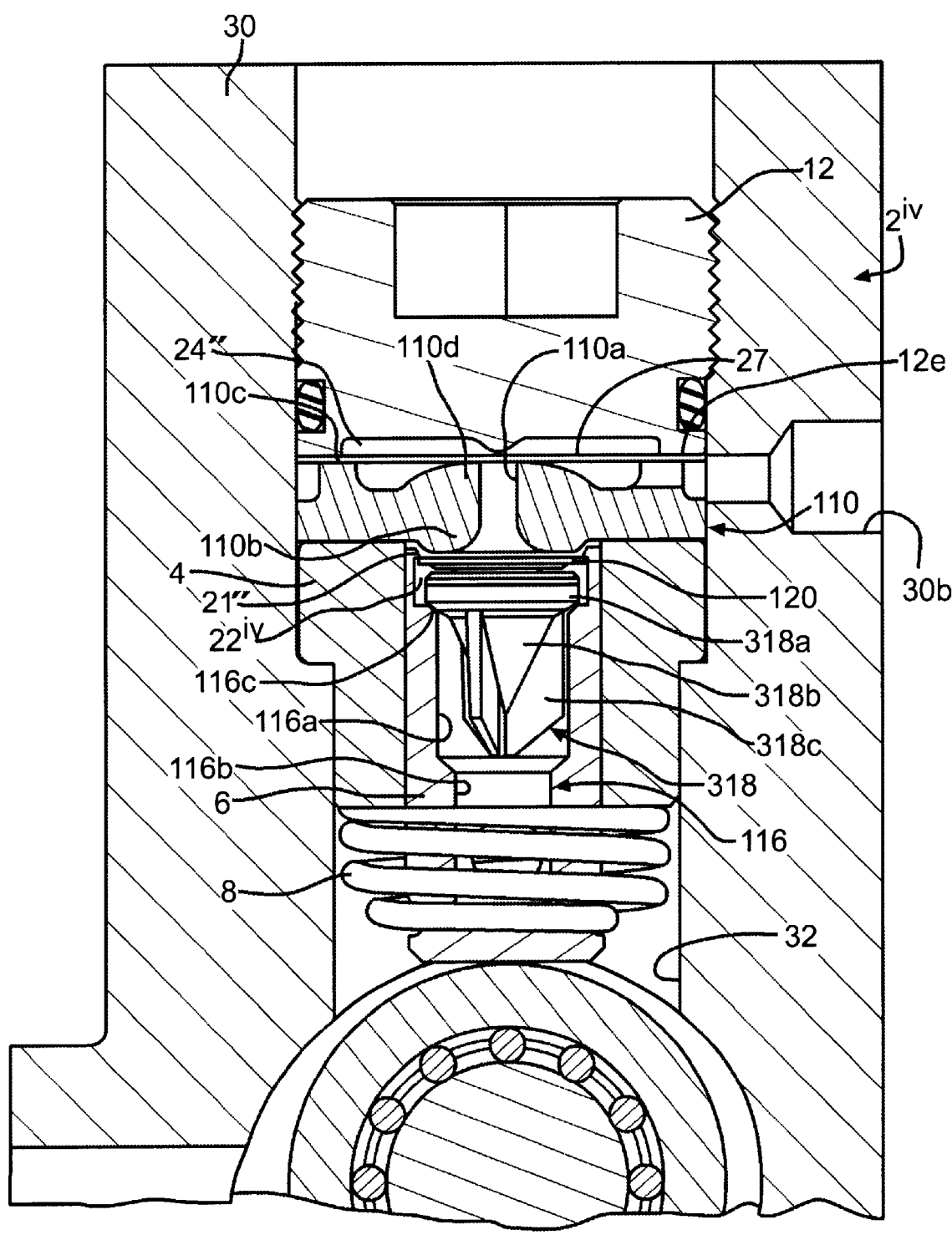
FIG. 10 is a cross-sectional view of an alternate embodiment of a piston pump in accordance with the present invention.

Referring now to FIG. 10, an alternate embodiment of a piston pump shown generally at 2iv. The piston pump 2iv contains many of the same elements as piston pump 2", but contains a novel inlet check valve member 318. The check valve member 318 includes a head 318a in the shape of a flat circular disk. A generally conical shaft 318b has a large diameter first end connected to the head 318a and a second end opposite the head 318a. Three trapezoidal gussets or fins 318c extend axially from the surface of the shaft 318b and are radially disposed at about 120 degrees from each other. The fins 318c extend axially along, and are fixed to, the shaft 318b from the first end to a point beyond the second end of the shaft 318b, the fins 318c being joined to one another with a shaped cross-section beyond the second end of the conical shaft 318b. The fins also extend radially along and are fixed to a surface of the head 318a. The structure of the valve member 318 ensures that the check valve member 318 will seat on a valve seat 116c quickly when the piston 6 begins motion from BDC during a compression stroke, which increases efficiency and reduces noise.

An outlet check valve seat 110 is attached to the cylinder 4. The outlet check valve seat 110 is generally disk-shaped with first and second opposed axial faces and an axially extending passageway 110a formed centrally therein for the passage of the working fluid. Preferably, the passageway 110a is volute shaped to reduce head loss of fluid passing therethrough. The first face abuts the second end of the cylinder 4, and includes a smoothly rounded annular boss 110b about the passageway 110a. The second face includes a plurality of castellations 110c distributed about the periphery of the second face of the check valve seat 110. A convex protrusion 110d is centrally formed about the opening of the passageway 110a in the second face of the check valve seat 110. A conical second spring 120 is disposed between the outlet check valve seat 110 and the inlet check valve member 318. The spring 120 is compressed and urges the inlet check valve member 318 to seat against the valve seat 116c. The spring 120 is retained in the piston 6 by a retainer 21". The retainer 21" is generally cup-shaped and is held within the first fluid passageway 116 by the annular boss 110b of the check valve seat 110. The retainer includes a large central aperture (not shown) extending therethrough to allow passage of working fluid.

Figure 11:
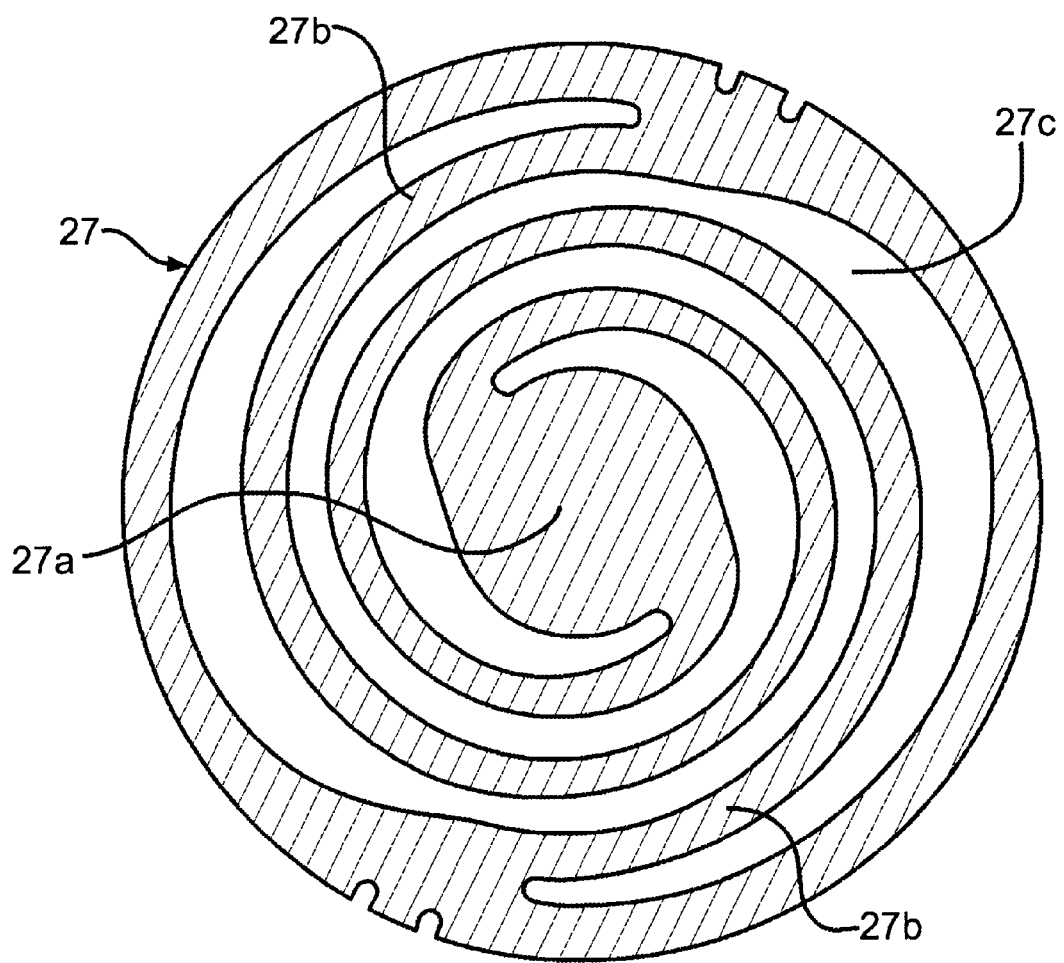
FIG. 11 is a plan view of the moveable spring element of FIG. 10.

A second fluid passageway $22^{iv}$ is formed between the first check valve member 318 and an opening of the fluid passageway 116 at the second end of the piston 6. A movable spring element 27 is disposed between the cylinder head 12 and the check valve seat 110. An annular boss 12e formed on a surface of the cylinder head 12 holds the outside edge of the spring element 27 against the outlet check valve seat 110. As shown in FIG. 11, the spring element 27 is similar to the spring element 23 shown in FIG. 5. As shown in FIG. 11, the movable spring element 27 is a generally annular disk having a solid central portion 27a, and a plurality of spirally arranged legs 27b defining channels 27c for the passage of fluid. Additionally, like the spring element 23, the spring element 27 may be formed by any suitable method, such as forming a plurality of springs 27 by conventional precision photo etching. Such photo etching may allow a plurality of springs 27 to be formed on a sheet 123 of suitable material, such as steel, as shown in FIG. 12, thereby minimizing manufacturing cost and increasing the dimensional accuracy of each spring element 27.

The spring element 27 has a spring tension and is sensitive to a pressure differential between the second fluid passageway $22^{iv}$ and a third fluid passageway 24". When the pressure in the second fluid passageway $22^{iv}$ is greater than the third fluid passageway 24", the spring element 27 deflects towards the third fluid passageway 24", allowing the passage of the working fluid through the channels 27c in the spring element 27. When the pressure in the second fluid passageway $22^{iv}$ is less than the pressure in the third fluid passageway 24", the central portion 27a of the spring element 27 closes against the protrusion 110d of the check valve seat 110, and seals the axial passageway 110a of the outlet check valve seat 110, thereby blocking the flow of the working fluid.

The incorporation of the one piece spring element 27 into provides low cost due to the reduction of the number of parts that must be purchased and assembled, compared to the combination of the check valve seat 10, second check valve member 26 and spring 28 of the pumps 2 and 2', the second check valve member 126 and the spring 28' of pump 2", and the second check valve member 226 and the spring 28' of pump 2'''. The remaining structure and operation of the piston pump $2^{iv}$ is identical to structure and operation of the piston pump 2'''.

Figure 16:
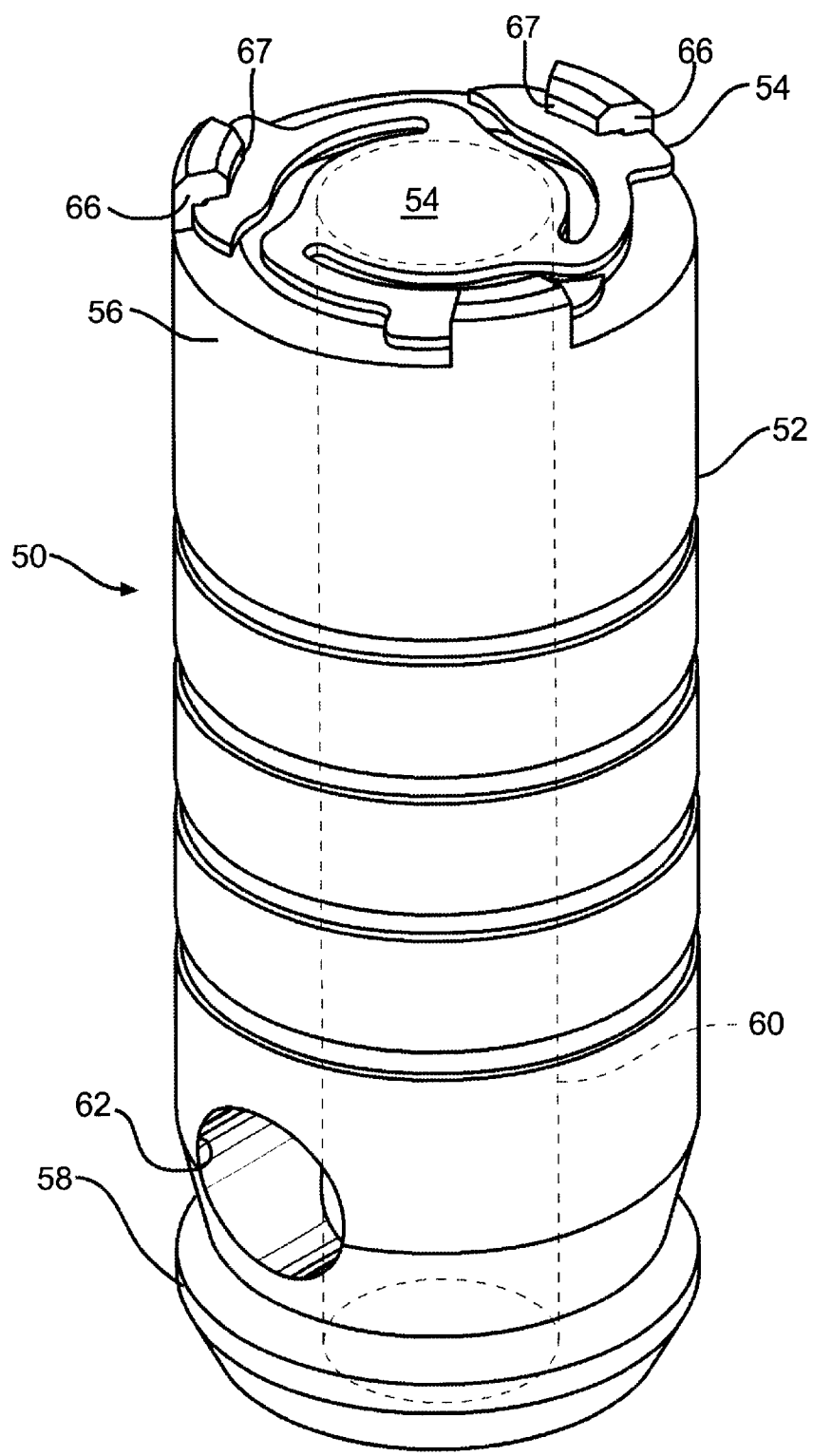
FIG. 16 is a perspective view of an alternate embodiment of an inlet check valve assembly.
Figure 17:
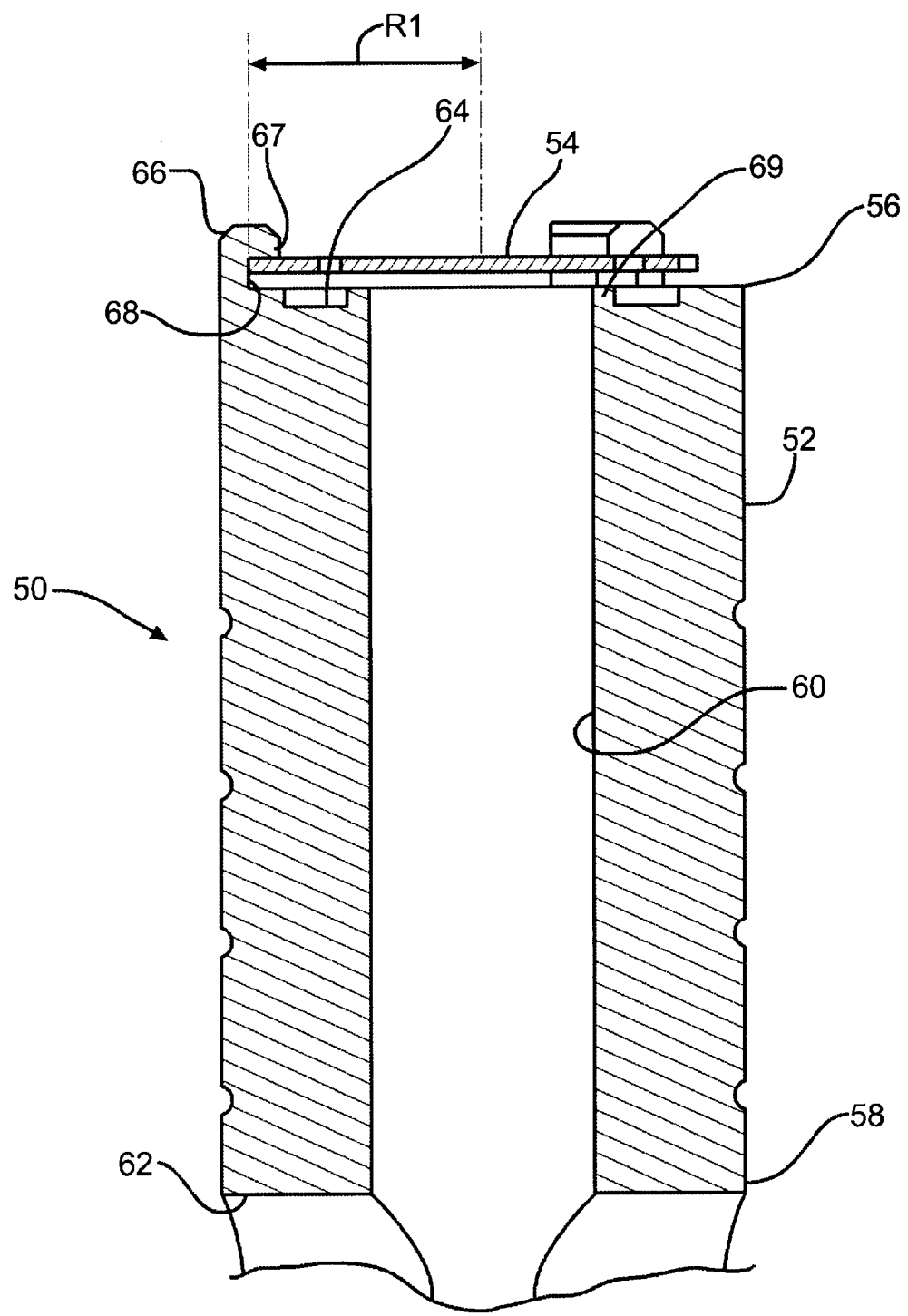
FIG. 17 is a cross-sectional view of the inlet check valve assembly in FIG. 16.
Figure 18:
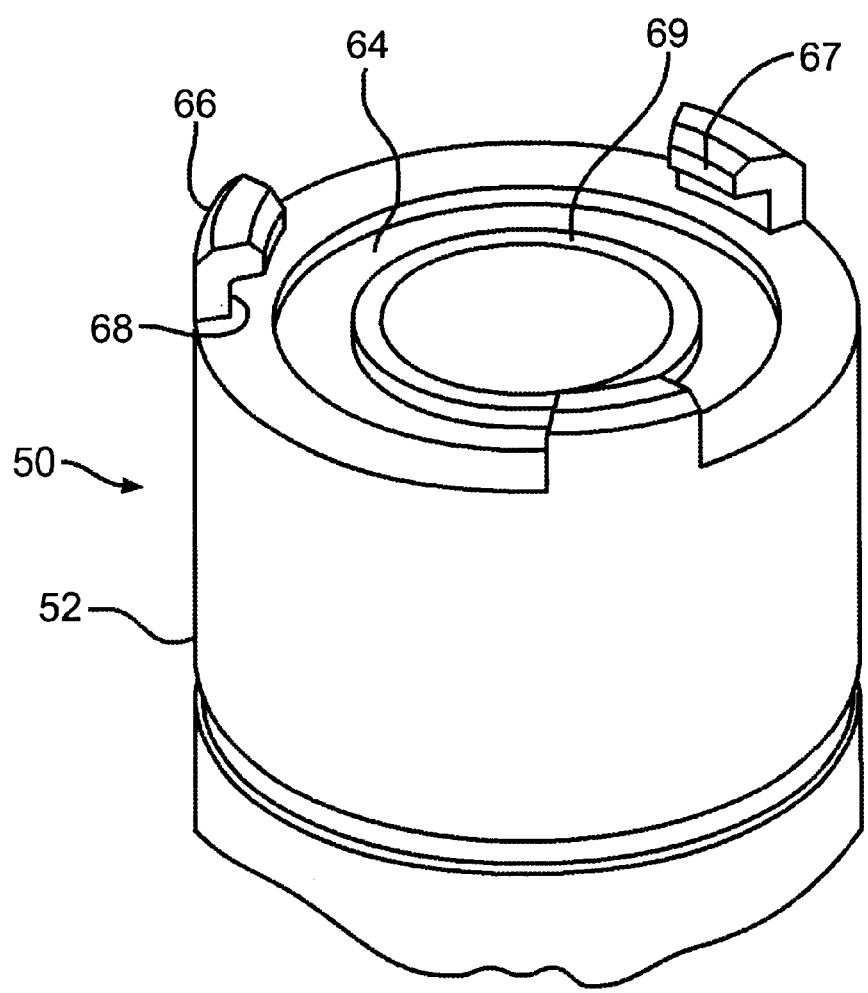
FIG. 18 is a perspective view of the first end of the piston illustrated in FIG. 16.

Referring now to FIGS. 16 through 18 there is generally shown at 50 an alternate embodiment of an inlet check valve assembly. The inlet check valve assembly 50 can be used, for example, in lieu of the piston 6, check valve member 18, retainer 21, and the movable spring element 23, as illustrated in FIGS. 1 through 6. The inlet check valve assembly 50 has only two components, including a piston 52 and a disk spring 54. The piston 52 is generally cylindrical and has a first end 56, a second end 58, a longitudinal passage 60, and a transverse passage 62. The transverse passage 62 provides fluid communication between the longitudinal passage 60 and the cavity 32 as illustrated in FIG. 1.

The first end 56 of the piston 52 has a generally flat surface having, in the illustrated embodiment, three bosses or fingers 66 formed thereon extending perpendicular to the flat surface. The piston 52 may alternatively be provided with more or fewer than three fingers 66. The fingers 66 are disposed radially at about 120 degrees from each other at the periphery of the surface of the first end 56. A flange 67 extends radially inward from the free end of each finger 66. An annular recess 64 is formed in the surface of the first end 56 between the longitudinal passage 60 and the fingers 66, and defines a valve seat 69 about the passage 60.

The disk spring 54 is attached to the piston 52 between the flange 67 of each finger 66 and the surface of the first end 56 of the piston 52. The distance between the surface of the first end 56 of the piston 52 and the flange 67 is typically greater than the thickness of the disk spring 54 to allow for longitudinal translation of the disk spring 54 as fluid flows through the disk spring 54. Each finger 66 is formed having a radius R1, defined as the distance between the center of the disk spring 54 and an inner longitudinal surface 68 of the finger 66.

As shown in FIGS. 19 through 22, the disk spring 54 is a generally annular disk having a central portion 70, three serpentine legs 72, and fluid channels 74 formed between each leg 72 and the central portion 70. The minimum radius of the central portion 70 is larger than the outer radius of the valve seat 69. Each leg 72 has a first tab 76 and a second tab 78 formed on an outer periphery thereof. A recess 80 is formed between the first and second tabs, 76 and 78, respectively. Each first tab 72 is formed having an arcuate peripheral edge and has a maximum radius no greater that a radius R2. Each second tab 78 has a radius R3. The radius R3 is slightly larger than the radius R1 of the piston 52. The radius R2 is slightly larger than the radius R1, but slightly smaller than the Radius R3.

Figure 19:
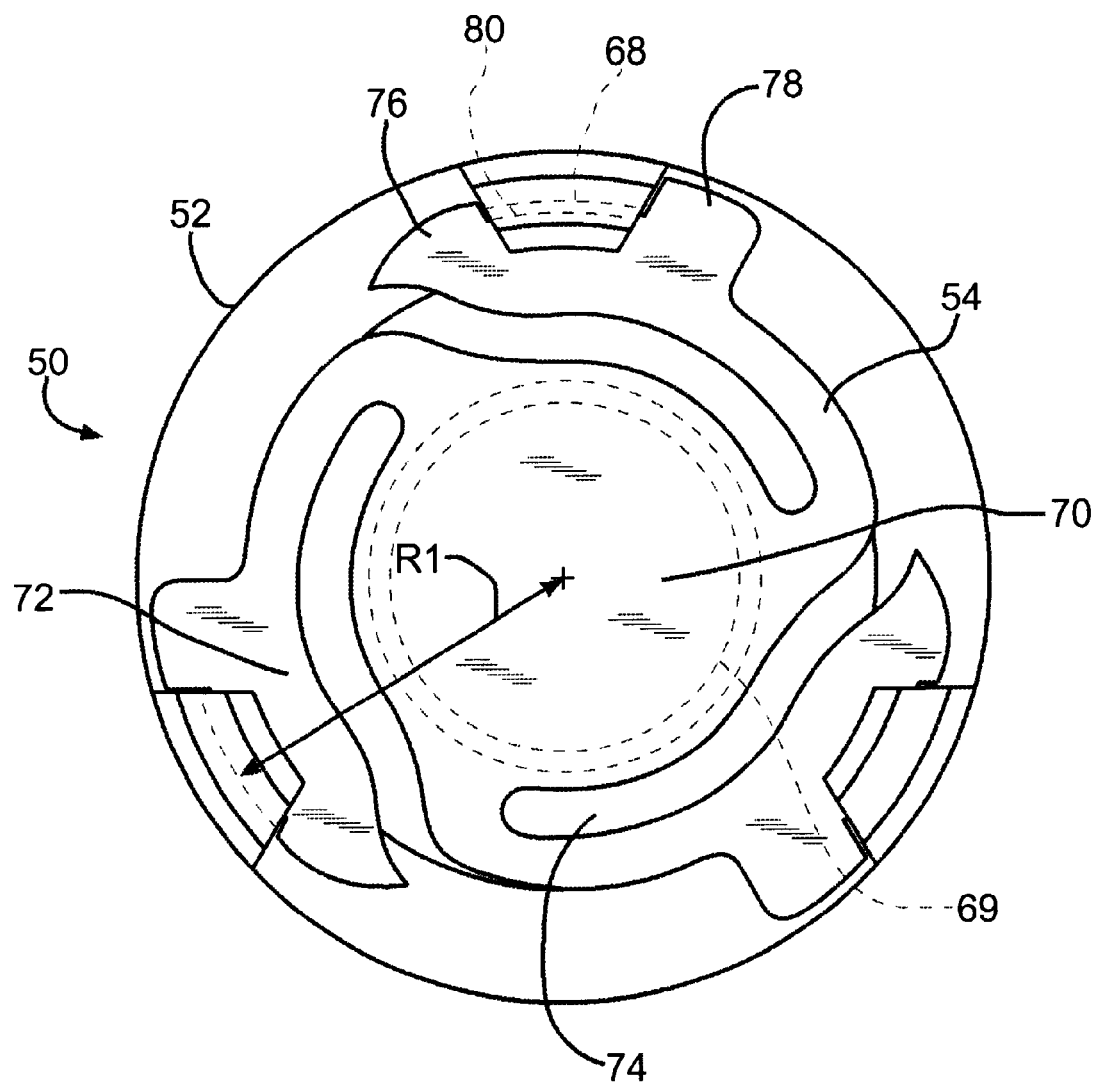
FIG. 19 is an end view of the inlet check valve assembly in FIG. 16, illustrating the disk spring locked to the piston.
Figure 20:
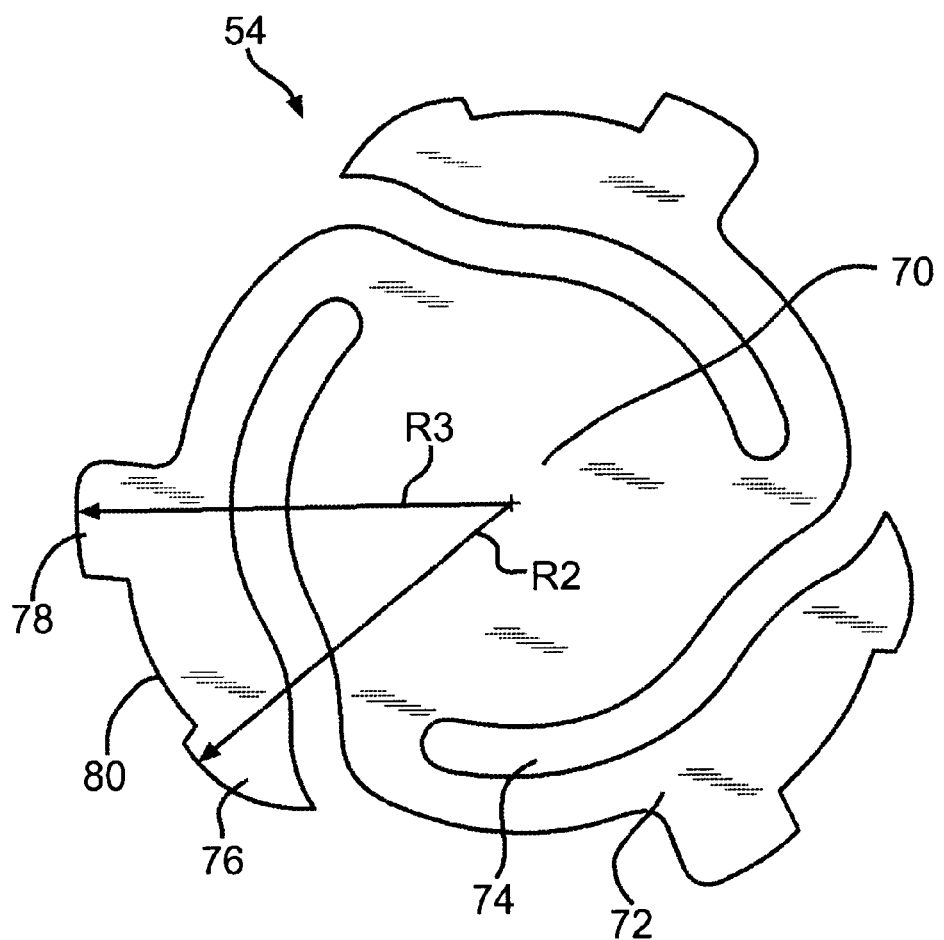
FIG. 20 is an end view of the disk spring illustrated in FIG. 16.
Figure 21:
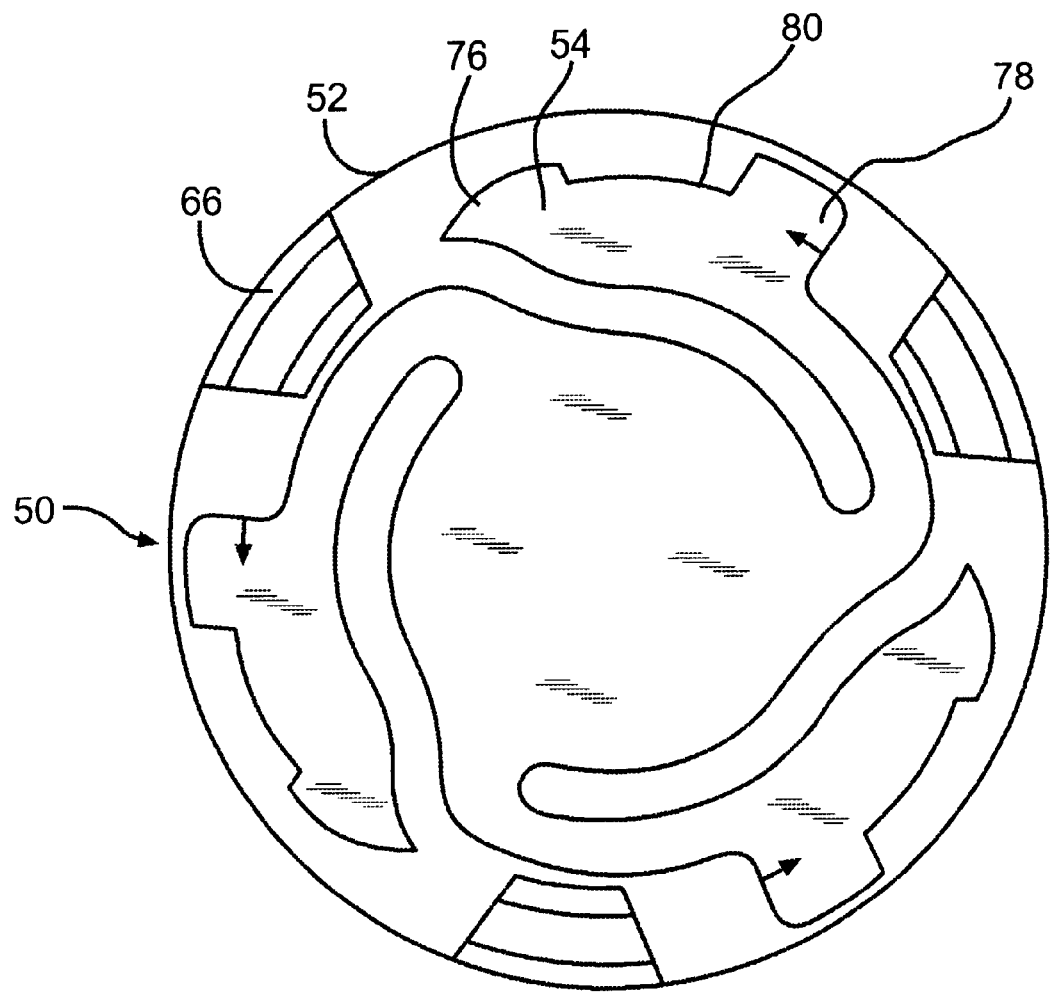
FIG. 21 is an end view of the inlet check valve assembly in FIG. 16, illustrating the inlet check valve assembly prior to locking the disk spring to the piston.
Figure 22:
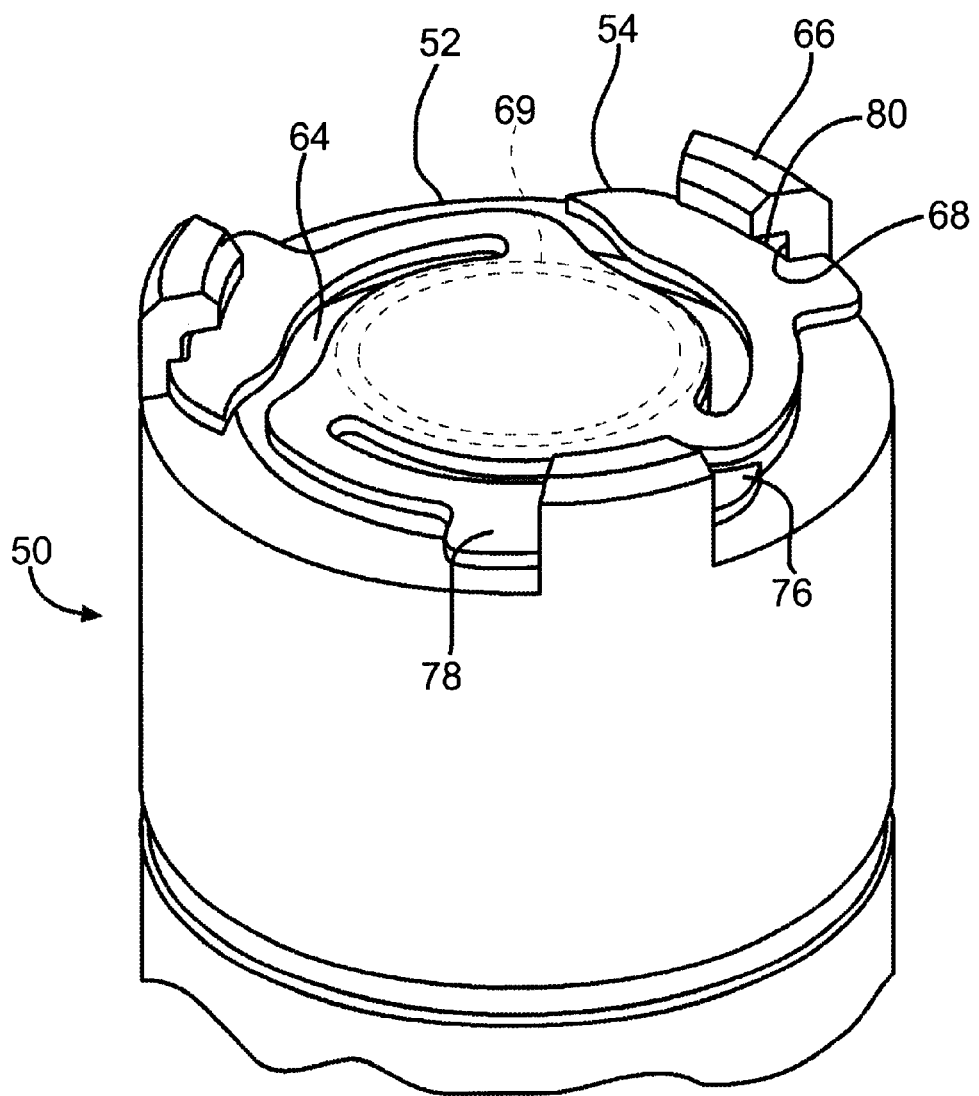
FIG. 22 is a perspective view of the inlet check valve assembly in FIGS. 16 and 19, illustrating the disk spring locked to the piston.

The disk spring 54 is installed in the piston 52 by first positioning the disk spring 54 on the first end 56 such that the fingers 66 are between the first tab 76 and the second tab 78, as illustrated in FIG. 21. The disk spring 54 is then rotated counter clockwise until each recess 80 is aligned with each finger 66, and positioned between the surface of the first end 56 of the piston 52 and the flange 67, as illustrated in FIGS. 19 and 22. When properly installed, the first and second tabs, 76 and 78, abut opposing sides of the finger 66 of the piston 52 and prevent circumferential movement of the disk spring 54.

Figure 23:
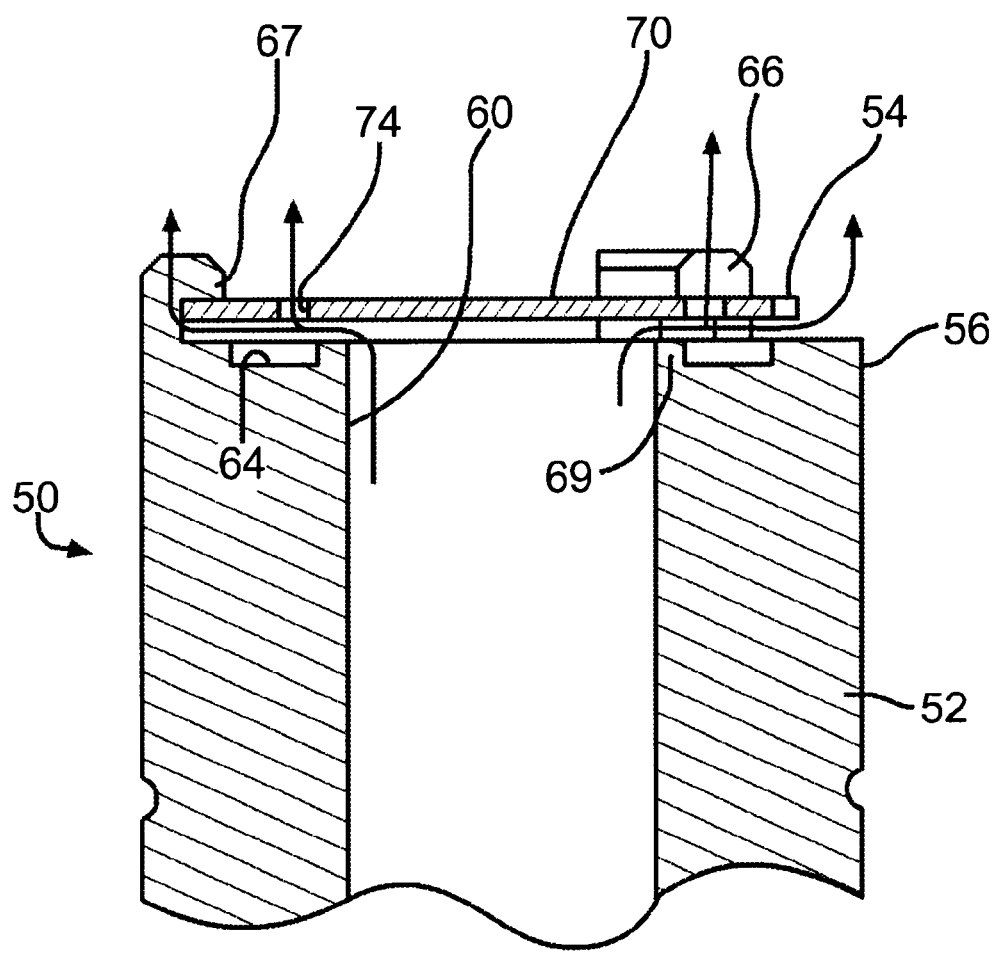
FIG. 23 is a cross-sectional side view of the inlet check valve assembly in FIGS. 16 and 19, illustrating the inlet check valve assembly in the open position.
Figure 24:
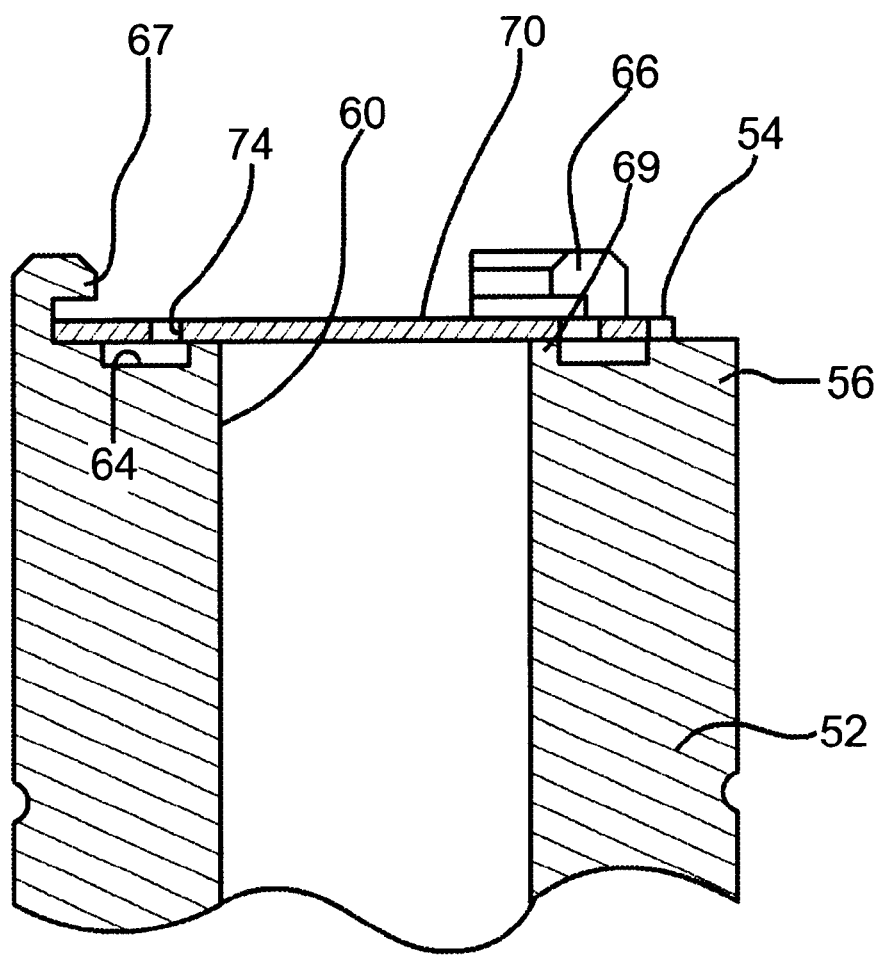
FIG. 24 is a cross-sectional side view of the inlet check valve assembly in FIGS. 16 and 19, illustrating the inlet check valve assembly in the closed position.

Referring now to FIGS. 23 and 24, the valve assembly 50 may open and close by longitudinal movement or translation of the disk spring 54 within the space between the surface of the first end 56 of the piston 52 and the flange 67. When fluid flows from the longitudinal passage 60 through the channels 74 of the disk spring 54, the spring 54 moves longitudinally outward of the surface of the first end 56, the force of the fluid urges the central portion 70 away from the valve seat 69, thereby opening the valve assembly 50, as shown in FIG. 23. When the central portion 70 of the spring 54 is seated on the valve seat 69, no fluid flows from the longitudinal passage 60, and the valve assembly 50 is closed, as shown in FIG. 24.

Figure 25:
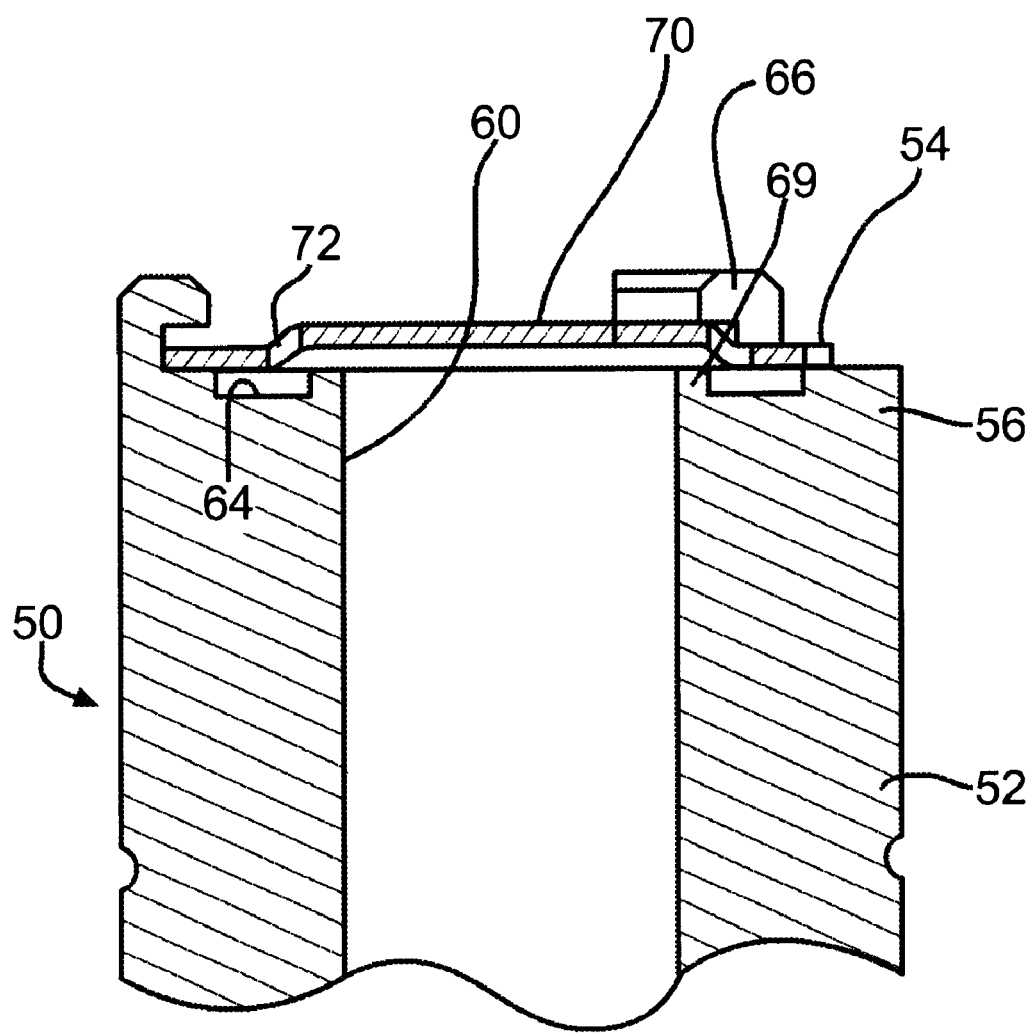
FIG. 25 is a cross-sectional side view of the inlet check valve assembly in FIGS. 16 and 19, illustrating the inlet check valve assembly in the open position by means of axial springing.

Referring to FIG. 25, the valve assembly 50 may open and close by axial springing of the legs 72 of the disk spring 54. Such axial springing occurs as the central portion 70 of the disk spring 54 moves axially in response a force generated by the flow of fluid through the longitudinal passage 60 from the second end 58 to the first end 56 of the piston 52. Alternatively, the valve assembly 50 may open and close by a combination of the longitudinal translation of the disk spring 54 as described above, and axial springing.

Figure 13:
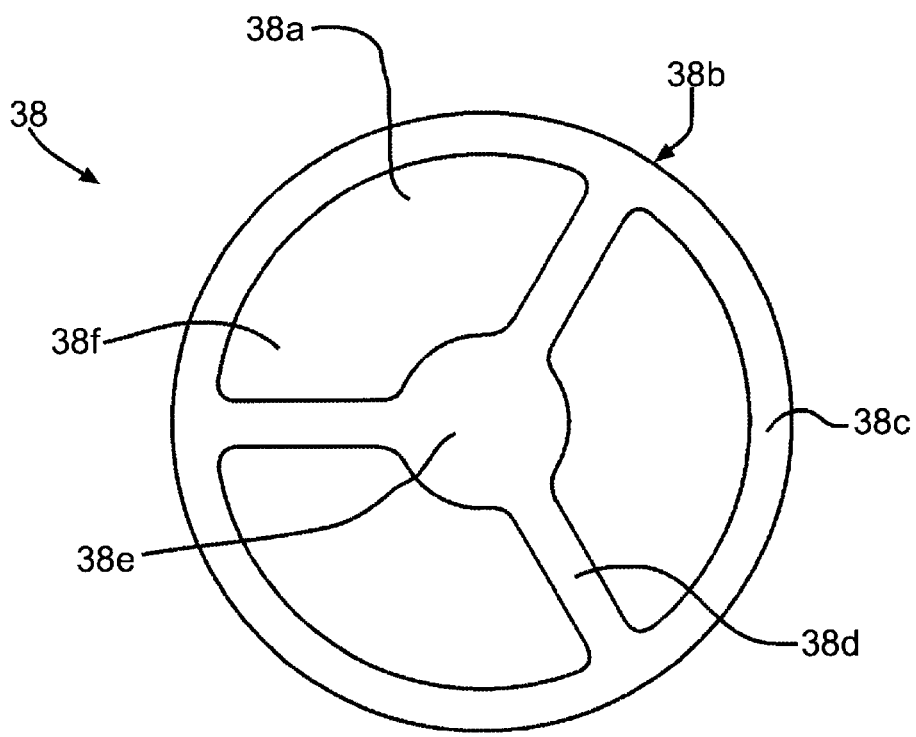
FIG. 13 is a plan view of an alternate embodiment of a movable check valve element in accordance with the present invention.

Referring now to FIG. 13, there is generally shown at 38 an alternate embodiment of a movable check valve element. The movable check valve element 38 can be used, for example, in lieu of the movable spring element 23 as illustrated in FIGS. 4 and 5. The movable check valve element 38 has the shape of a flat circular disk and has a first layer 38a and a second layer 38b. The first layer 38a has the shaped of a circular disk. The second layer 38b also has the shape of a circular disk and includes a circular outer portion 38c defining the periphery of the second layer 38b, three legs 38d extending radially outwardly from a circular center portion 38e. The legs 38d are equiangular spaced at about 120 degrees from each other and define openings 38f therebetween.

Figure 13A:
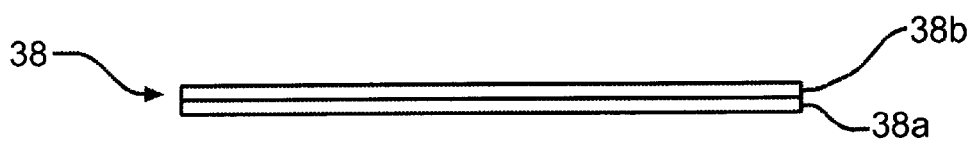
FIG. 13A is a side view of the movable check valve element of FIG. 13.

The check valve element 38 is preferably of a composite construction consisting of two or more materials with different thermal expansion coefficients, such as, for example, ASTM-TM-1. In the embodiment illustrated in FIGS. 13 and 13A, a check valve element of two materials with different thermal expansion coefficients, represented by a first layer 38a and a second layer 38b, is shown. However, it will be appreciated that satisfactory results may be achieved by a check valve element 38 having more than two materials.

Figure 13B:
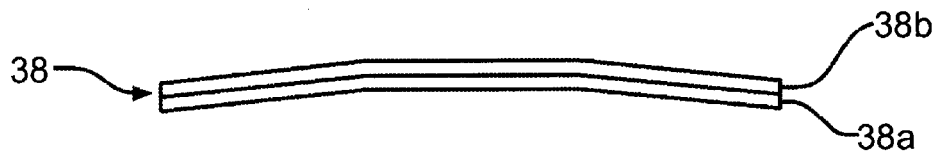
FIG. 13B is a side view of the movable check valve element of FIG. 13, showing the movable check valve element in a first bowed position.
Figure 13C:
FIG. 13C is a side view of the movable check valve element of FIG. 13, showing the movable check valve element in a second bowed position.

A check valve element 38 formed from two different materials as described above could, for example, bow in a first direction, as shown in FIG. 13B, as the working fluid temperature lowers. Conversely, such a check valve element 38 could bow in a second direction as the working fluid temperature rises, as shown in FIG. 13C. Of course, a less dramatic arrangement can be envisioned where the check valve element is bowed as shown in FIG. 13B at a lowest design temperature, and is bowed less, but in the same direction, at a highest design temperature. This ability to bow or change shape with changing temperatures can be used to change the length of travel of the check valve ball 18 during varying temperature conditions.

It is known to manufacture a check valve without a spring while limiting the motion of the check valve so that the check valve ball 18 can travel only a limited distance from a valve seat, thereby allowing the check valve ball 18 to easily re-seat during the pumping stroke. It has been shown that a such a check valve constructed to operate at higher temperatures, such as, for example 100 degrees Celsius or higher, will not operate as efficiently at lower temperatures, such as, for example, −40 degrees Celsius or lower, because the check valve ball cannot travel far enough off the valve seat to allow high viscosity fluid to pass freely. Similarly, a check valve constructed to work well at lower temperatures, such as, for example, −40 degrees Celsius or lower, will be less efficient at higher temperatures, such as, for example, 100 degrees Celsius or higher because the check valve ball is off the valve seat for a longer period of time, thereby allowing working fluid to return through the check valve rather than being pumped out.

As shown in FIGS. 13B and 13C, the check valve element 38 is preferably formed from two different materials so the check valve element 38, when used in lieu of the movable spring element 23, will bow toward valve seat 16b (see FIG. 4) when the temperature rises thereby shortening the length of travel of the ball 18, as shown in FIG. 13C. As the temperature of the working fluid lowers, the check valve element 38 will bow away from the valve seat 16b (see FIG. 4), thereby increasing the length of travel of the ball 18, as shown in FIG. 13B.

Referring now to FIG. 14, there is shown at 40 another alternate embodiment of a movable check valve element. The check valve element 40 is constructed of a single material which has a thermal expansion coefficient different than a thermal expansion coefficient of the piston 6 material. Preferably, the check valve element 40 is formed of a material having a thermal expansion coefficient of from about 8 to about 12 times greater than the thermal expansion coefficient of the piston 6. For example, satisfactory results may be achieved by forming the check valve element from a thermoplastic material such as polyethyl ethyl ketone (PEEK). The check valve element 40 has the shape of a circular disk. The check valve element 40 includes a circular outer portion 40a defining the periphery thereof, and four legs 40b extending radially outwardly and axially at an angle from a circular center portion 40c to the outer portion 40a. The legs 40b are equiangular spaced at about 90 degrees from each other and define openings 40d therebetween.

As described above in regards to FIG. 4, the check valve element 40 may be attached to the piston 6 by the retainer 21 in lieu of spring element 23. When retained by the retainer 21, the check valve element 40 is attached to an end surface of the second end of the piston 6, and thereby prevented from moving radially outwardly or in either axial direction. Unlike the check valve element 40, the piston 6 and the retainer 21 do not deform when the temperature of the working fluid changes. Therefore, when formed from a temperature sensitive material as described above, and when used in lieu of the movable spring element 23, the check valve element 40 will bow in response to a change in the temperature of the working fluid. This ability to bow or change shape with changing temperatures can be used to change the length of travel of the check valve ball 18 during varying temperature conditions. For example, the check valve element 40 will bow a first distance toward valve seat 16b (see FIG. 4) when the temperature of the working fluid lowers, thereby increasing the length of travel of the ball 18, as shown in FIG. 15. As the temperature of the working fluid rises, the check valve element 40 will bow a second distance, greater than the first distance, toward the valve seat 16b (see FIG. 4), thereby reducing the length of travel of the ball 18, as shown in FIG. 15A.

While the invention has been described in terms of various embodiments having specific combinations of inlet check valve members and outlet check valve members, it will be appreciated that satisfactory results may be achieved by combining any of the inlet check valve members described herein with any of the outlet check valve members described herein in a piston pump of the invention.

The principle and mode operation of this invention have been explained and illustrated in its preferred embodiment. However, it must be understood that this invention may be practiced otherwise than as specifically explained and illustrated without departing from its spirit or scope

What is claimed is:

1. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston having a first passageway formed therein, said first passageway having an inlet end and an outlet end, the inlet end of said first passageway of said piston being in fluid communication with said cavity of said pump housing;

a first spring member fixed with a snap fit to an exterior portion of said piston and fixed with a snap fit to said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a retaining element for limiting the range of movement of said first check valve member, said retaining element having an aperture for the passage of fluid;

a second check valve member disposed between said cylinder head and said second end of said cylinder, said second check valve member allowing fluid to flow only from the inlet to the outlet of said second passageway;

a second spring member extending between said cylinder head and said second check valve member, said second spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

2. The piston pump according to claim 1 wherein said retaining element includes a generally cup-shaped retainer having a plurality of apertures extending therethrough, said cup-shaped retainer engaging said piston and retaining said first check valve member within said first passageway of said piston.

3. The piston pump according to claim 1 wherein said retaining element is spaced apart from said first check valve member when said first check valve member is seated on said piston valve seat.

4. The piston pump according to claim 1 wherein said cylinder is one of a plurality of cylinders disposed in said pump housing, each of said plurality of cylinders having a reciprocal piston therein for pumping fluid.

5. The piston pump according to claim 1 wherein said first spring member is releasably fixed to an exterior portion of said piston and releasably fixed to said cylinder.

6. The piston pump according to claim 1 wherein said cylinder, said piston, and said first spring member define a subassembly;
- wherein said first spring member comprises a conical spring having a large diameter end and a small diameter end;
- wherein the first end of said cylinder includes a tapered portion substantially in the shape of a frustrum of a cone and a circumferentially extending first groove formed at a larger diameter portion of the frustrum;
- wherein the first end of said piston includes a circumferentially extending second groove in an outer surface thereof; and
- wherein the large diameter end of said conical spring is disposed within the first groove of said cylinder, and the small diameter end of said conical spring is disposed within the second groove of said piston.

7. The piston pump according to claim 6 wherein said conical spring is disposed within the first groove of said cylinder with a snap fit, and within the second groove of said piston with a snap fit.

8. A piston pump comprising:
- a pump housing defining a cavity therein;
- a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;
- a piston slidably received in said open first end of said cylinder, said piston having a first passageway formed therein, said first passageway having an inlet end and an outlet end, the inlet end of said first passageway of said piston being in fluid communication with said cavity of said pump housing;
- a first spring member fixed with a snap fit to an exterior portion of said piston and fixed with a snap fit to said cylinder;
- a piston valve seat being defined about said outlet end of said piston;
- a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;
- a first check valve member disposed in the outlet end of said first passageway of said piston, said first check valve member cooperating with said piston valve seat to allow fluid to flow only from the inlet end of said first passageway of said piston to the outlet end of said first passageway of said piston;
- a second spring member extending between said first check valve member and said piston, said second spring member biasing said first check valve member toward said inlet end of said first passageway of said piston;
- a second check valve member disposed between said cylinder head and said second end of said cylinder, said second check valve member allowing fluid to flow only from the inlet to the outlet of said second passageway;
- a third spring member extending between said cylinder head and said second check valve member, said third spring member biasing said second check valve member toward said outlet check valve seat of said second end of said cylinder; and
- a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

9. The piston pump according to claim 8 further including a generally bell-shaped check valve seat mounted within said outlet end of said first passageway of said piston.

10. The piston pump according to claim 8 wherein said second spring member is a conical spring, said spring member being attached to said bell-shaped check valve seat and to said piston.

11. The piston pump according to claim 8 wherein said second check valve member is generally disk-shaped having first and second opposed axial faces, said first axial face cooperating with said open second end of said cylinder to define a separation between said first passageway of said piston and said second passageway of said cylinder head, said third spring member engaging said second axial face of said second check valve member to urge said second check valve member toward said cylinder.

12. The piston pump according to claim 8 wherein said second check valve member is generally disk-shaped having first and second opposed axial faces, said first axial face being generally planar and cooperating with said open second end of said cylinder to define a separation between said first passageway of said piston and said second passageway of said cylinder head, said second axial face having an annular boss centered thereon and defining a generally cylindrical recess, an outwardly extending surface of said annular boss engaging said third spring member.

13. The piston pump according to claim 8 wherein said second check valve member is generally disk-shaped having first and second opposed axial faces, each of said axial faces having an annular boss centered thereon and defining a generally cylindrical recess, an outwardly extending surface of said annular boss of each of said axial faces able to cooperate with said open second end of said cylinder and engage said third spring member.

14. The piston pump according to claim 8 wherein said cylinder is one of a plurality of cylinders disposed in said pump housing, each of said cylinders having a reciprocal piston therein for pumping fluid.

15. The piston pump according to claim 8 wherein said first spring member is releasably fixed to an exterior portion of said piston and releasably fixed to said cylinder.

16. The piston pump according to claim 8 wherein said cylinder, said piston, and said first spring member define a subassembly;
- wherein said first spring member comprises a conical spring having a large diameter end and a small diameter end;
- wherein the first end of said cylinder includes a tapered portion substantially in the shape of a frustrum of a cone and a circumferentially extending first groove formed at a larger diameter portion of the frustrum;
- wherein the first end of said piston includes a circumferentially extending second groove in an outer surface thereof; and
- wherein the large diameter end of said conical spring is disposed within the first groove of said cylinder, and the small diameter end of said conical spring is disposed within the second groove of said piston.

17. The piston pump according to claim 16 wherein said spring is disposed within the first groove of said cylinder with a snap fit, and within the second groove of said piston with a snap fit.

18. A check valve, comprising:
a body having a first axial surface, a second axial surface, and an axial passageway formed therethrough;
a plurality of fingers extending axially from said second axial surface of said body, each of said fingers having an inner surface and an outer surface;
a flange extending radially inward from the distal end of each of said plurality of fingers; and
a generally planar movable element disposed between said second axial surface and each said flange of each of said plurality of fingers, said movable element travelling between an open position in which fluid can flow through said axial passageway, and a closed position in which fluid is prevented from flowing through said axial passageway.

19. The check valve according to claim 18 wherein said movable element is a disk spring having a plurality of serpentine legs defining channels for the passage of fluid, and a central portion for preventing the passage of fluid, whereby said disk spring travels from an open position in which fluid can flow through said axially extending passageway and a closed position in which fluid is prevented from flowing through said axially extending passageway, said retaining element slidingly attached to said body between the second axial surface of said body and each flange of each of said plurality of fingers.

20. A piston pump comprising:
a pump housing defining a cavity therein;
a subassembly comprising:
a cylinder having open first and second ends, said cylinder being disposed in said cavity within said housing, a longitudinal bore being defined through said cylinder, said longitudinal bore having an inlet at said first end and an outlet at said second end, said cylinder defining an outlet check valve seat about the outlet of said second end;
a piston slidably received in said open first end of said cylinder, said piston having a first passageway formed therein, said first passageway having an inlet end and an outlet end, the inlet end of said first passageway of said piston being in fluid communication with said cavity of said pump housing, a piston valve seat being defined about said outlet end of said piston; and
a first spring member fixed with a snap fit to an exterior portion of said piston and fixed with a snap fit to said cylinder;
a cylinder head attached to said cylinder of said subassembly, said cylinder head enclosing said open second end of said cylinder, a second passageway being formed within said cylinder head, said second passageway having an inlet and an outlet, the outlet of said second passageway being in fluid communication with an aperture in said pump housing;
a first check valve member disposed in the outlet end of said first passageway of said piston, said first check valve member cooperating with said piston valve seat to allow fluid to flow only from the inlet end of said first passageway of said piston to the outlet end of said first passageway of said piston;
a second spring member fixed to said piston, said second spring member disposed to bias said first check valve member toward said inlet end of said first passageway of said piston;
a second check valve member disposed between said cylinder head and said second end of said cylinder, said second check valve member allowing fluid to flow only from the inlet to the outlet of said second passageway;
a third spring member extending between said cylinder head and said second check valve member, said third spring member biasing said second check valve member toward said outlet check valve seat of said second end of said cylinder; and
a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

21. The piston pump according to claim 20, wherein said second spring member is spaced apart from said first check valve member when said first check valve member is seated against said piston valve seat.

22. The piston pump according to claim 20 wherein said first spring member comprises a conical spring having a large diameter end and a small diameter end;
wherein the first end of said cylinder includes a tapered portion substantially in the shape of a frustrum of a cone and a circumferentially extending first groove formed at a larger diameter portion of the frustrum;
wherein the first end of said piston includes a circumferentially extending second groove in an outer surface thereof; and
wherein the large diameter end of said conical spring is disposed within the first groove of said cylinder, and the small diameter end of said conical spring is disposed within the second groove of said piston.

23. The piston pump according to claim 22 wherein said spring is disposed within the first groove of said cylinder with a snap fit, and within the second groove of said piston with a snap fit.

24. A piston pump comprising:
a pump housing defining a cavity therein;
a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;
a piston slidably received in said open first end of said cylinder, said piston having a first passageway formed therein, said first passageway having an inlet end and an outlet end, the inlet end of said first passageway of said piston being in fluid communication with said cavity of said pump housing;
a first spring member bearing against an exterior portion of said piston and bearing against said cylinder;
a piston valve seat being defined about said outlet end of said piston;
a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a retaining element including a disk spring, said retaining element for limiting the range of movement of said first check valve member, and having an aperture for the passage of fluid;

a second check valve member disposed between said cylinder head and said second end of said cylinder, said second check valve member allowing fluid to flow only from the inlet to the outlet of said second passageway;

a second spring member extending between said cylinder head and said second check valve member, said second spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

25. The piston pump according to claim 24 wherein said retaining element further includes a generally cup-shaped retainer having a central aperture extending therethrough, said cup-shaped retainer engaging said piston and retaining said disk spring against said piston.

26. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston having a first passageway formed therein, said first passageway having an inlet end and an outlet end, the inlet end of said first passageway of said piston being in fluid communication with said cavity of said pump housing;

a first spring member bearing against an exterior portion of said piston and bearing against said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a disk spring for limiting the range of movement of said first check valve member, said disk spring having a plurality of spirally arranged legs defining channels for the passage of fluid, and a central portion aperture for receiving said first check valve member, said disk spring attached to said outlet end of said piston, whereby deflection of said legs limits the movement of said first check valve member;

a second check valve member disposed between said cylinder head and said second end of said cylinder, said second check valve member allowing fluid to flow only from the inlet to the outlet of said second passageway;

a second spring member extending between said cylinder head and said second check valve member, said second spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

27. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston having a first passageway formed therein, said first passageway having an inlet end and an outlet end, the inlet end of said first passageway of said piston being in fluid communication with said cavity of said pump housing;

a first spring member bearing against an exterior portion of said piston and bearing against said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a movable element for limiting the range of movement of said first check valve member, said movable element having an aperture for the passage of fluid and being formed from at least two materials having different thermal expansion coefficients, whereby a change in temperature causes said movable element to change shape such that the limitation on movement of said first check valve member by said retaining element is changed;

a second check valve member disposed between said cylinder head and said second end of said cylinder, said second check valve member allowing fluid to flow only from the inlet to the outlet of said second passageway;

a second spring member extending between said cylinder head and said second check valve member, said second spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

28. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston having a first passageway formed therein, said first passageway having an inlet end and an outlet end, the inlet end of said first passageway of said piston being in fluid communication with said cavity of said pump housing;

a first spring member bearing against an exterior portion of said piston and bearing against said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a retaining element for limiting the range of movement of said first check valve member, said retaining element having an aperture for the passage of fluid, and being formed of a material having a thermal expansion coefficient different from the thermal expansion coefficient of the material from which said piston is formed, said retaining element being positioned adjacent said piston, whereby a change in temperature causes at least a portion of said retaining element to distort relative to said piston, whereby the range of movement of said first check valve member is changed;

a second check valve member disposed between said cylinder head and said second end of said cylinder, said second check valve member allowing fluid to flow only from the inlet to the outlet of said second passageway;

a second spring member extending between said cylinder head and said second check valve member, said second spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

29. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston comprising:
  a first axial surface,
  a second axial surface,
  an axial first passageway formed from said first axial surface to said second axial surface, said first passageway having an inlet end and an outlet end, the inlet end of said first passageway of said piston being in fluid communication with said cavity of said pump housing,
  a plurality of fingers extending axially from said second axial surface, each of said fingers having an inner surface and an outer surface, and
  a flange extending radially inward from a free end of each of said plurality of fingers;

a first spring member bearing against an exterior portion of said piston and bearing against said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a retaining element for limiting the range of movement of said first check valve member, said retaining element having an aperture for the passage of fluid;

a second check valve member disposed between said cylinder head and said second end of said cylinder, said second check valve member allowing fluid to flow only from the inlet to the outlet of said second passageway;

a second spring member extending between said cylinder head and said second check valve member, said second spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

30. The piston pump according to claim 29 wherein said retaining element is a disk spring having a plurality of serpentine legs defining channels for the passage of fluid, and a central portion for preventing the passage of fluid, said disk spring being attached to said second axial surface of said piston, whereby said disk spring travels between an open position in which fluid can flow through said axial passageway, and a closed position in which fluid is prevented from flowing through said axial passageway.

31. The piston pump according to claim 29 wherein said retaining element is a disk spring having a plurality of serpentine legs defining channels for the passage of fluid, and a central portion for preventing the passage of fluid, said disk spring being slidingly attached to said second axial surface of said piston, whereby said disk spring travels between an open position in which fluid can flow through said axial passageway, and a closed position in which fluid is prevented from flowing through said axial passageway.

32. The piston pump according to claim 30 wherein said disk spring is disposed between said second axial surface of said piston and each said flange of each of said plurality of fingers, said disk spring travelling between an open position in which fluid can flow through said axial passageway of said piston, and a closed position in which fluid is prevented from flowing through said axial passageway.

33. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston having a first passageway formed therein, said first passageway having an inlet end and an outlet end, the inlet end of said first passageway of said piston being in fluid communication with said cavity of said pump housing;

a first spring member bearing against an exterior portion of said piston and bearing against said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston, wherein said first check valve member includes a generally disk-shaped head, a shaft having a generally cylindrical first end connected to said disk-shaped head and a generally conical second end opposite said disk-shaped head, said shaft having a plurality of generally triangular fins disposed circumferentially on the shaft at about 120 degrees from each other, said fins extending from said disk-shaped head to said second end of said shaft, each of said fins having a lip for attaching said second spring member formed at said second end of said shaft;

a second spring member extending between said first check valve member and said piston, said second spring member biasing said first check valve member toward said inlet end of said first passageway of said piston;

a second check valve member disposed between said cylinder head and said second end of said cylinder, said second check valve member allowing fluid to flow only from the inlet to the outlet of said second passageway;

a third spring member extending between said cylinder head and said second check valve member, said third spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

34. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston having a first passageway formed therein, said first passageway having an inlet end and an outlet end, the inlet end of said first passageway of said piston being in fluid communication with said cavity of said pump housing;

a first spring member bearing against an exterior portion of said piston and bearing against said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston, wherein said first check valve member includes a generally disk-shaped head, a generally conical shaft having a large diameter first end connected to said disk-shaped head and a second end opposite said disk-shaped head, said shaft having a plurality of generally trapezoidal fins disposed circumferentially on the shaft at about 120 degrees from each other, said fins extending axially along said shaft from said disk-shaped head to a point beyond said second end of said shaft, said fins being joined to one another with a Y-shaped cross-section beyond said second end of said conical shaft;

a second spring member extending between said first check valve member and said piston, said second spring member biasing said first check valve member toward said inlet end of said first passageway of said piston;

a second check valve member disposed between said cylinder head and said second end of said cylinder, said second check valve member allowing fluid to flow only from the inlet to the outlet of said second passageway;

a third spring member extending between said cylinder head and said second check valve member, said third spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

35. The piston pump according to claim 34 wherein said second spring member is a conical spring extending between said second first check valve member and said second check valve member, said conical spring biasing said first check valve member toward said inlet end of said piston.

36. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston having a first passageway formed therein, said first passageway having an inlet end and an outlet end, the inlet end of said first passageway of said piston being in fluid communication with said cavity of said pump housing;

a first spring member bearing against an exterior portion of said piston and bearing against said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a second spring member extending between said first check valve member and said piston, said second spring member biasing said first check valve member toward said inlet end of said first passageway of said piston;

a second check valve member disposed between said cylinder head and said second end of said cylinder, said second check valve member allowing fluid to flow only from the inlet to the outlet of said second passageway, wherein said second check valve member includes generally disk-shaped check valve seat having first and second opposed axial faces and an axially extending passageway formed centrally therein, and a spring element, said first axial face of said check valve seat having a smoothly rounded annular boss about said axially extending passageway and abutting said second end of said cylinder, said second axial face having a plurality of castellations at a periphery thereof and a convex protrusion centrally formed about an opening of said axially extending passageway, said spring element secured in place between said cylinder head and said second check valve member;

a third spring member extending between said cylinder head and said second check valve member, said third spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

37. The piston pump according to claim 36 wherein said axially extending passageway is volute shaped.

38. The piston pump according to claim 36 wherein said retaining element is a disk spring having a plurality of spirally arranged legs defining channels for the passage of fluid, and a central portion for preventing the passage of fluid, whereby said disk spring travels between an open position in which fluid can flow through said axially extending passageway, and a closed position in which fluid is prevented from flowing through said axially extending passageway.

39. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore having an inlet at said first end and an outlet at said second end, said cylinder defining an outlet check valve seat about the outlet of said second end;

a piston slidably received in said open first end of said cylinder, said piston comprising:

a first end surface, a second end surface, an axial passageway formed from said first end surface to said second end surface, said first passageway having an inlet end and an outlet end, the inlet end of said first passageway of said piston being in fluid communication with said cavity of said pump housing, a plurality of fingers extending axially from said first end surface, and a flange extending radially inward from a free end of each of said plurality of fingers;

a first spring member bearing against an exterior portion of said piston and bearing against said cylinder;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a second spring member extending between said first check valve member and said piston, said second spring member biasing said first check valve member toward said inlet end of said first passageway of said piston;

a second check valve member disposed between said cylinder head and said second end of said cylinder, said second check valve member allowing fluid to flow only from the inlet to the outlet of said second passageway;

a third spring member extending between said cylinder head and said second check valve member, said third spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

40. The piston pump according to claim 39 wherein said retaining element is a disk spring having a plurality of serpentine legs defining channels for the passage of fluid, and a central portion for preventing the passage of fluid, said disk spring being attached to said second axial surface of said piston, whereby said disk spring travels between an open position in which fluid can flow through said axial passageway of said piston, and a closed position in which fluid is prevented from flowing through said axial passageway of said piston.

41. The piston pump according to claim 39 wherein said retaining element is a disk spring having a plurality of serpentine legs defining channels for the passage of fluid, and a central portion for preventing the passage of fluid, said disk spring being slidingly attached to said second axial surface of said piston, whereby said disk spring travels between an open position in which fluid can flow through said axial passageway, and a closed position in which fluid is prevented from flowing through said axial passageway.

42. The piston pump according to claim 40 wherein said disk spring is disposed between said second axial surface of said piston and said flange of each of said plurality of fingers, said disk spring travelling between an open position in which fluid can flow through said axial passageway of said piston, and a closed position in which fluid is prevented from flowing through said axial passageway.

43. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore defining an inside diameter and having an inlet at said first end and an outlet at said second end, said cylinder defining an outlet check valve seat about the outlet of said second end;

a generally cylindrical piston slidably received in said open first end of said cylinder, said piston having a first passageway formed therein, said first passageway having an inlet end and an outlet end, the inlet end of said first passageway of said piston being in fluid communication with said cavity of said pump housing, wherein an outer surface of said piston defines a largest outside diameter, the largest outside diameter being smaller than the inside diameter of said cylinder, and wherein said piston includes a circumferentially extending groove defined in the outer surface thereof, said groove defining a groove diameter smaller than the largest outside diameter;

a first spring member fixed to an exterior portion of said piston and fixed to said cylinder, wherein said first spring member directly engages said piston within said groove, and wherein said first spring urges said piston and said cylinder relatively away from each other;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a retaining element for limiting the range of movement of said first check valve member, said retaining element having an aperture for the passage of fluid;

a second check valve member disposed between said cylinder head and said second end of said cylinder, said second check valve member allowing fluid to flow only from the inlet to the outlet of said second passageway;

a second spring member extending between said cylinder head and said second check valve member, said second spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

44. A piston pump comprising:

a pump housing defining a cavity therein;

a cylinder having open first and second ends, said cylinder being attached to said pump housing and disposed in said cavity within said housing, a longitudinal bore being defined through said cylinder, said longitudinal bore defining an inside diameter and having an inlet at said first end and an outlet at said second end, said cylinder defining an outlet check valve seat about the outlet of said second end;

a generally cylindrical piston slidably received in said open first end of said cylinder, said piston having a first passageway formed therein, said first passageway having an inlet end and an outlet end, the inlet end of said first passageway of said piston being in fluid communication with said cavity of said pump housing, wherein an outer surface of said piston defines a largest outside diameter, the largest outside diameter being smaller than the inside diameter of said cylinder, and wherein said piston includes a circumferentially extending groove defined in the outer surface thereof, said groove defining a groove diameter smaller than the largest outside diameter;

a first spring member fixed to an exterior portion of said piston and fixed to said cylinder, wherein said first spring member directly engages said piston within said groove, and wherein said first spring urges said piston and said cylinder relatively away from each other;

a piston valve seat being defined about said outlet end of said piston;

a cylinder head attached to said cylinder and to said pump housing, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a second spring member extending between said first check valve member and said piston, said second spring member biasing said first check valve member toward said inlet end of said first passageway of said piston;

a second check valve member disposed between said cylinder head and said second end of said cylinder, said second check valve member allowing fluid to flow only from the inlet to the outlet of said second passageway;

a third spring member extending between said cylinder head and said second check valve member, said third spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

45. A piston pump comprising:

a pump housing defining a cavity therein;

a subassembly comprising:

a cylinder having open first and second ends, said cylinder being disposed in said cavity within said housing, a longitudinal bore being defined through said cylinder, said longitudinal bore defining an inside diameter and having an inlet at said first end and an outlet at said second end, said cylinder defining an outlet check valve seat about the outlet of said second end;

a generally cylindrical piston slidably received in said open first end of said cylinder, said piston having a first passageway formed therein, said first passageway having an inlet end and an outlet end, the inlet end of said first passageway of said piston being in fluid communication with said cavity of said pump housing, a piston valve seat being defined about said outlet end of said piston, wherein an outer surface of said piston defines a largest outside diameter, the largest outside diameter being smaller than the inside diameter of said cylinder, and wherein said piston includes a circumferentially extending groove defined in the outer surface thereof, said groove defining a groove diameter smaller than the largest outside diameter; and a first spring member fixed to an exterior portion of said piston and fixed to said cylinder, wherein said first spring member directly engages said piston within said groove, and wherein said first spring urges said piston and said cylinder relatively away from each other;

a cylinder head attached to said cylinder of said subassembly, said cylinder head enclosing said open second end of said cylinder, a second passageway being formed within said cylinder head, said second passageway having an inlet and an outlet, the outlet of said second passageway being in fluid communication with an aperture in said pump housing;

a first check valve member disposed in the outlet end of said first passageway of said piston, said first check valve member cooperating with said piston valve seat to allow fluid to flow only from the inlet end of said first passageway of said piston to the outlet end of said first passageway of said piston;

a second spring member fixed to said piston, said second spring member disposed to bias said first check valve member toward said inlet end of said first passageway of said piston;

a second check valve member disposed between said cylinder head and said second end of said cylinder, said second check valve member allowing fluid to flow only from the inlet to the outlet of said second passageway;

a third spring member extending between said cylinder head and said second check valve member, said third spring member biasing said second check valve member toward said outlet check valve seat of said second end of said cylinder; and a drive arrangement selectively reciprocating said piston in said cylinder, whereby fluid is introduced into said first passageway of said piston, passes into said longitudinal bore of said cylinder via said first check valve member, is urged from said longitudinal bore by the reciprocating motion of said piston, and is delivered to said second passageway via said second check valve member.

46. A piston sub-assembly for a piston pump, said piston pump including a pump body defining a bore and a surface about said bore, said bore defining an inside diameter, said piston sub-assembly comprising:

a generally cylindrical piston slidably received in said bore, wherein an outer surface of said piston defines a largest outside diameter, the largest outside diameter being smaller than the inside diameter of said bore, and wherein said piston includes a circumferentially extending groove defined in the outer surface thereof, said groove defining a groove diameter smaller than the largest outside diameter; and a spring member fixed to an exterior portion of said piston and engaging said surface of said pump body, wherein said spring member directly engages said piston within said groove, and wherein said spring urges said piston relatively away from said pump.

* * * * *